(12) United States Patent
Tang et al.

(10) Patent No.: US 10,713,399 B2
(45) Date of Patent: Jul. 14, 2020

(54) METHOD OF BATCHING AND SCHEDULING FOR STEELMAKING PRODUCTION WITH PLANT-WIDE PROCESS CONSIDERATION

(71) Applicant: Northeastern University, Shenyang, Liaoning Province (CN)

(72) Inventors: Li xin Tang, Shenyang (CN); Gong shu Wang, Shenyang (CN); Wen jie Xu, Shenyang (CN)

(73) Assignee: NORTHEASTERN UNIVERSITY, Shenyang, Liaoning Province (CN)

( * ) Notice: Subject to any disclaimer, the term of this patent is extended or adjusted under 35 U.S.C. 154(b) by 389 days.

(21) Appl. No.: 15/529,745

(22) PCT Filed: Nov. 14, 2016

(86) PCT No.: PCT/CN2016/105581
§ 371 (c)(1),
(2) Date: May 25, 2017

(87) PCT Pub. No.: WO2017/088674
PCT Pub. Date: Jun. 1, 2017

(65) Prior Publication Data
US 2017/0316131 A1 Nov. 2, 2017

(30) Foreign Application Priority Data
Nov. 23, 2015 (CN) .......................... 2015 1 0824047

(51) Int. Cl.
*G06F 30/20* (2020.01)
*C21C 5/52* (2006.01)
(Continued)

(52) U.S. Cl.
CPC ............. *G06F 30/20* (2020.01); *C21C 5/28* (2013.01); *C21C 5/4673* (2013.01);
(Continued)

(58) Field of Classification Search
None
See application file for complete search history.

(56) References Cited

FOREIGN PATENT DOCUMENTS

| CN | 1792501 A | 6/2006 |
|---|---|---|
| CN | 1885328 A | 12/2006 |

(Continued)

OTHER PUBLICATIONS

Yu et al. "Multi-objective order planning model and algorithm for integrated steel production", 2008 International Conference on Management Science and Engineering 15th Annual Conference Proceedings, 6 pages. (Year: 2008).*

(Continued)

*Primary Examiner* — Suzanne Lo
(74) *Attorney, Agent, or Firm* — Muncy, Geissler, Olds & Lowe, P.C.

(57) ABSTRACT

Provided is a method of batching and scheduling for steelmaking production with plant-wide process consideration, including the steps of: establishing a mathematical model for quantitatively describing the decision problem of batching on steelmaking and continuous casting procedures; starting from the production capacity balance between parallel equipment of the same procedure, and material flow convergence between upstream and downstream procedures, establishing a model for the assignment and sequencing of batches on continuous casting equipment and the time dimension; integrating the batching plan and the production scheduling scheme, issuing the batching plan and the production scheduling scheme integrated to all production and manufacturing units at the steelmaking stage. The present invention improves product quality, increases the material yield, resource utilization rate and equipment operation efficiency, realizes load balance on parallel equipment and smooth material linkage between serial equipment, and (Continued)

reduces the material flow transportation jam, downstream equipment waiting time and inventory.

8 Claims, 11 Drawing Sheets

(51) Int. Cl.

| | | |
|---|---|---|
| *C21C 5/46* | (2006.01) | |
| *G06Q 50/04* | (2012.01) | |
| *G06Q 10/06* | (2012.01) | |
| *C21C 5/28* | (2006.01) | |
| *C21D 11/00* | (2006.01) | |
| *C23C 2/00* | (2006.01) | |
| *C23G 1/08* | (2006.01) | |
| *G06F 17/11* | (2006.01) | |
| *G06F 17/16* | (2006.01) | |
| *G06F 111/10* | (2020.01) | |

(52) U.S. Cl.
CPC ............ *C21C 5/5294* (2013.01); *C21D 11/00* (2013.01); *C23C 2/00* (2013.01); *C23G 1/08* (2013.01); *G06F 17/11* (2013.01); *G06F 17/16* (2013.01); *G06Q 10/0631* (2013.01); *G06Q 50/04* (2013.01); *C21C 2005/5288* (2013.01); *G06F 2111/10* (2020.01); *Y02P 10/216* (2015.11); *Y02P 90/30* (2015.11)

(56) References Cited

FOREIGN PATENT DOCUMENTS

| | | | |
|---|---|---|---|
| CN | 101303588 A | | 11/2008 |
| CN | 102364510 A | * | 2/2012 |
| CN | 105483310 A | | 4/2016 |
| JP | 2003088952 A | | 3/2003 |
| JP | 6299155 B2 | * | 3/2018 |

OTHER PUBLICATIONS

English translation for CN102364510A, Google Patents. (Year: 2012).*
English translation for JP6299155B2, Google Patents. (Year: 2018).*
Tang et al. "An Improved Differential Evolution Algorithm for Practical Dynamic Scheduling in Steelmaking-Continuous Casting Production" IEEE Transactions on Evolutionary Computation, vol. 18, No. 2, Apr. 2014, p. 205-229 (Year: 2014).*

* cited by examiner

METHOD OF BATCHING AND SCHEDULING FOR STEELMAKING PRODUCTION WITH PLANT-WIDE PROCESS CONSIDERATION

BACKGROUND OF THE INVENTION

1. Field of the Invention

The present invention belongs to the technical field of metallurgical automatic control, and particularly relates to a method of batching and scheduling for steelmaking production with plant-wide process consideration.

2. The Prior Arts

A prominent characteristic of a steel production process lies in that physical and chemical reactions continuously occur to a material flow during the process, with the state, nature and shapes continuously changed; devices to achieve the physical and chemical reactions to the material flow during steel production are mostly in very large scales and operate in modes such as continuous production, quasi-continuous production, and batch production; during the continuous production, raw materials continue passing through the same equipment, each piece of equipment is relatively stable and only performs a specific processing task, while semi-finished or finished products are output in a continuous flow manner; during the batch production, the raw materials are processed according to set processing sequence and operating conditions, and the products are output in the batching manner; the quasi-continuous production is a mixed mode between the continuous and intermittent production; in the ironmaking procedure, blast furnace production is a continuous operation course, is in the production state and continues except maintenance, and molten iron is output alternatively and contiguously through iron outlets. Therefore, the ironmaking procedure is a typical continuous production course. In the steelmaking procedure, a converter or electric arc furnace can smelt 150-300 tons of molten steel once, which is called a heat; after the molten steel in each heat is smelted and poured into a ladle, the converter or electric arc furnace can be used for smelting molten steel of the next heat after being cleaned; clearly, in the steelmaking procedure, smelting of each heat of molten steel corresponds to a batch processing course; multiple heats of molten steel can be continuously cast in a continuous caster, but due to the impacts of service life of crystallizers and tundishes as well as the diversity in specifications of steel grades and slabs, the continuous caster will be stopped and cleaned up after producing a certain number of heats, while key equipment, that is, the tundishes and crystallizers need to be replaced, which course often lasts for 2-3 hours; therefore, the continuous casting procedure belongs to a batch production course, and each production batch of the continuous casting procedure is called a cast and defined as a sequence of heats continuously cast with the same tundish and crystallizer on the same continuous caster; in the hot rolling procedure, slabs after being heated are also continuously processed on a continuous rolling mill; however similarly, due to roller wearing and other process factors, the continuous rolling mill also needs to be stopped after continuously processing a certain number of slabs, and after the equipment can be cleaned, rollers are replaced; the hot rolling procedure also belongs to the batch production course. Each production batch in the hot rolling procedure is called a rolling turn which is defined as a sequence of slabs continuously rolled by the same roller; similar to the hot rolling procedure, the cold rolling procedure is also a batch production course. With the continuous production course, only some limited grades of products can be produced, and only macro-control can be achieved on a total capacity and a total amount, but micro-control on physical and chemical properties of the products cannot be realized; however, the batch production courses are different; before production of each batch of products, products with similarity in process requirements for the physical and chemical properties usually need to be batched, thereby improving the production efficiency, increasing the finished product rate, and reducing resource loss and energy consumption.

In addition to the characteristics of long production process and batch production mode, modern iron and steel enterprises also have gradually increased scales, and product line layout presents characteristics of parallel structures for multiple units of the same procedure and serial mesh cross structures among procedures; driven by complex internal product line structures and increasingly intense external market competition, iron and steel enterprises put forward higher requirements for comprehensive production indicators, such as production efficiency, energy consumption level, product quality, and production costs; therefore, it is necessary to start from the perspective of the plant-wide process, reasonably arrange material flow relations among procedures, and optimize material linkage between procedures at the level of production plan and scheduling, so as to improve the global production efficiency of enterprises. Before steelmaking stage, the ironmaking production in the blast furnace is a continuous process, and a production organization course is also made to inventory. After steelmaking stage, the production process mainly uses batch mode, and the produced solid semi-finished products and finished products such as slabs, hot-rolled coils and cold-rolled coils are closely related to customers' needs, and the production organization course is made to order; a steelmaking procedure is a source procedure made to order, having numerous downstream units and complex product line layouts; therefore, during determination of production organization and arrangement (including decision for determination of compositions of the batch) at the steelmaking stage, it is necessary to pay a high degree of attention to current material inventory and material requirements of the downstream units, and to keep a balance between the capacity and inventory of the units, so as to prevent a situation that some units have more inventory than necessary while some units have to stop due to lack of materials; therefore, it is a very important and extremely complicated technical problem faced by iron and steel enterprises how to scientifically and quantitatively determine batch compositions of steelmaking procedures as well as batch assignment and sequencing in different steelmaking shops and continuous casting equipment, and provide material flows of semi-finished products to the downstream units on different shifts during a certain production period. This technical problem is also called an optimization problem for integration of batching plan and batch scheduling for steelmaking production with plant-wide process consideration, in which it is required to make decisions about batch composition, batch assignment and sequencing in steelmaking and continuous casting procedures, as well as material flow distribution between downstream steelmaking procedures under limited conditions of considering the production process including all procedures of the plant-wide process.

At present, in order to solve the optimization problem for integration of batching plan and batch scheduling for steelmaking production with plant-wide process consideration, enterprises usually adopt a manual scheduling method relying on planners' subjective experience, which usually includes the following steps of: firstly, distributing material flows from the steelmaking to the downstream procedures with an empirical method through the planners' qualitative analysis of capacity and inventory of the units, then roughly determining batch compositions with a method of merging the same items, and finally, assigning and sequencing the batches to the units according to manually set rules; due to a large number of production data involved in the actual production, numerous and complex production process factors need to be considered, and therefore, after such manual scheduling method is used, the following problems exist:

(1) some complex process constraints are usually simplified or ignored due to a lack of quantitative description and modeling, so that the finally determined batches cannot be produced on the units, batch compositions need to be re-adjusted at the production site, and the smoothness of the production course is further destroyed;

(2) during manual scheduling, numerous production data information cannot be all considered, generally, rough statistics are performed with a classification method according to data attributes, and then the data information is partially considered; with such simple data classification statistical method, most of the details of the data information are covered, and incomplete consideration for information can directly reduce the properties of global optimization of planning and scheduling; and (3) neither quantitative calculation is performed on technical and economic indicators of the resultant planning and scheduling, nor trade-off is performed between the multiple technical indicators and economic indicators, so that effects of the resultant planning and scheduling greatly rely on the planners' professional skill, and solution to the technical problem is lack of quantitative nature and scientific nature.

Therefore, through deep analysis on production procedure courses for the plant-wide process of steel and iron making, a quantitative scientific calculation method is used to make decisions about steelmaking batching plan and batch scheduling production with plant-wide process consideration; on the basis of ensuring normal operation of the equipment, the production organization for products required by customers is reasonably arranged so as to improve the production efficiency of the equipment, improve the inventory structure and straighten production logistics, which is of great significance to optimize the production process level, increase the control and management level of the production course, reduce energy consumption of procedures and achieve low-cost manufacturing of the plant-wide process of steel and iron making.

Currently, the published patent ("ZL 200810011659.1", Automatic Making Method and System of Steelmaking and Continuous Casting Heat Batch Planning) mainly enables slabs to be combined in the heat to achieve the batch production of the steelmaking procedure; the published patent ("ZL200610046981.9", Steelmaking-continuous Casting Tundish Batch Planning Method and System) mainly enables heat to be batched to the tundish to realize the batch production of the continuous caster. Patent ZL200810011659.1 and Patent ZL200610046981.9 mainly solve the technical problem of operation batching in the steelmaking and continuous casting procedures, without considering production load balance between multiple shops and units, nor considering the material flow supply balance among adjacent procedures, even not considering the integration optimization of batching decision with scheduling decision and other technical problems.

SUMMARY OF THE INVENTION

In view of shortcomings of the prior art, the present invention provides a method of batching and scheduling for steelmaking production with plant-wide process consideration, to achieve the purpose that steel material flow is evenly and punctually distributed in the equipment and the time dimensions in the plant-wide process.

The method of batching and scheduling for steelmaking production with plant-wide process consideration includes the following steps of:

step 1, describing a production environment by constructing a directed topological network, wherein each node on the directed topological network represents a specific production unit or inventory equipment, including: a converter, a refining furnace, a continuous caster, a slab warehouse, a hot rolling mill, a temper mill, a hot-rolled coil warehouse, an acid pickling unit and an acid rolling mill; each arc on the directed topological network represents a specific material transfer course from one unit or inventory equipment to another unit or inventory equipment, including: molten steel, slabs, hot-rolled coils and cold-rolled coils;

step 2, according to quality requirements for finished products by different customers' orders, setting product process parameters, including: determining the mapping of a product manufacturing process in the directed topological network, calculating casting width ranges of different products in the continuous caster according to steel grades, determining the upgrade relationship between different steel grades, and determining the casting with steel grade change and cost of different types of steel in tundishes;

step 3, determining grouping to which product orders belong according to the steel grades, categories, optional manufacturing process and width ranges of the products required by the customers' orders, wherein if the sum of unfullfilled quantities for all orders required by customers is greater than or equal to the maximum number of allowed process continuous casting heats of the tundishes, such customers' orders belong to a subset of large orders, and performing step 6; or else the sum of unfullfilled quantities for all orders required by the customers is smaller than the maximum number of allowed process continuous casting heats of the tundishes, such customers' orders belong to a subset of small orders, and performing step 4 to step 5;

step 4, describing the batching production decision of multiple products in the steelmaking procedure by constructing a mathematical model, including the following steps of:

step 4-1, mapping a multi-product batching scheme in a steelmaking production course into decision variables for the mathematical model;

step 4-2, mapping process limits for the steelmaking production course into constraint conditions for the mathematical model, including the following steps of:

step 4-2-1, establishing process constraints for substitution relationship of the product steel grades;

step 4-2-2, establishing process constraints for the casting width ranges of the products on continuous casting equipment;

step 4-2-3, establishing process constraints for smelting capacity limit of each batch of the converter, which requires a total weight of the slabs required by the customer orders and open-ordered slabs limited within the same batch of smelting is larger or less than a standard smelting capacity of the converter by a weight of one slab or less, the open-ordered slabs are surplus materials produced to satisfy the full capacity of converter during smelting course but not assigned to any customers' orders;

step 4-2-4, establishing process constraints for balancing on two strands so as to synchronize the consumptions of molten steel of two strands during casting of each furnace of molten steel on the continuous caster, requiring that casting times of two strands of the same furnace of molten steel on the continuous caster need to be equal to each other, which is mapped on the model as equal number of slabs cast from the two strands;

step 4-2-5, establishing process constraints for cutting length ranges of the slabs on the continuous casting equipment, under limits by the cutting process of the continuous caster and length ordered by the customers, requiring that the lengths of any slabs cast from one furnace of molten steel need to be within a specified range; and step 4-2-6, constructing flexible management constraints for customers' order quantities, requiring that the part below or beyond the customers' order quantities needs to be less than the weight of one slab;

step 4-3, mapping optimized process indicators during a steelmaking production course into an objective function of the mathematical model, to minimize the total weight of the open-ordered slabs output from all batches, minimize the upgrade quantity between different steel grades, minimize the total deviation quantity between the weight of slabs produced in all batches and the standard smelting capacity of the converter, and minimize the total deviation number of quantities ordered by all customers' orders;

step 5, constructing a mutual mapping relationship between a real matrix and the batching scheme, and using an established real matrix as a controlled object to obtain a final optimization batching scheme based on a multi-object parallel iterative improvement strategy, and then to obtain a pre-batching scheme of the subset of small orders in the continuous casting procedure, including the following steps of:

step 5-1, constructing a mutual mapping relationship between the real matrix and the batching scheme, including the following steps of:

step 5-1-1, constructing a real matrix, wherein the dimension of the real matrix is a product of a total product number, the steel grade and the width of all products, and an element in the matrix is a ratio of the weight of the slabs assigned to a certain steel grade and a certain width by a certain order to the order unfulfilled quantity;

step 5-1-2, obtaining the weight of the slabs with the objective steel grade and an objective width, in all batches, set in a certain order, and the weight of the slabs with the objective steel grade and the objective width, in all batches, sequencing (from large to small) all combinations of the steel grades and widths according to the weight values of all ordered slabs in all batches, and performing steps 5-1-3 to 5-1-9 in the sequence;

step 5-1-3, determining weight vectors of slabs with any combinations of steel grades and widths set by all the orders, constructing an empty batch, and setting the weight of slabs contained in the empty batch to be 0;

step 5-1-4, selecting one order with a first slab of which the weight is greater than 0 from the slab weight vectors, and comparing the remaining capacity of the empty batch with the size of the first slab weight; if the remaining capacity is greater than or equal to the weight of the first slab, performing step 5-1-5, or else performing step 5-1-6;

step 5-1-5, replacing the unfulfilled quantity of a corresponding product in the flexible management constraint conditions for the customers' order quantities with the slab weight of the product, obtaining an integer number of slabs according to the process conditions set forth in steps 4-2-5 to 4-2-6, putting the slabs in the empty batch, updating the slab weight of the batch and setting the slab weight of the product in the slab weight vectors to be 0; then, performing step 5-1-7;

step 5-1-6, replacing the unfulfilled quantity of a corresponding product in the flexible management constraint conditions for the customers' order quantities with the remaining capacity, obtaining an integer number of slabs according to the process conditions set forth in steps 4-2-5 to 4-2-6, putting the slabs in the empty batch, updating the slab weight of the batch and setting the slab weight of the product in the slab weight vectors to be 0;

step 5-1-7, in the absence of the addition of open-ordered slabs, judging whether the slabs contained in the empty batch meet the process constraint conditions limited by the smelting capacity of the converter for each batch; if yes, performing step 5-1-8, or else, performing step 5-1-9;

step 5-1-8, judging whether the slabs contained in the empty batch meet constraint conditions of the balancing on two strands so as to synchronize the consumptions of molten steel of two strands; if yes, directly creating the next empty batch not containing any order and setting the weight of the slabs contained in this batch to be 0, or else remedying the batch by adding or removing one slab to/from the empty batch so as to meet the constraints for balancing on two strands, then creating the next empty batch not containing any order and setting the weight of the slabs contained in this batch to be 0; then, performing step 5-1-10;

step 5-1-9, judging whether the slab weight vector is equal to 0, if yes, adding open-ordered slabs in the last non-empty batch according to the process constraint conditions limited by the smelting capacity of the converter for each batch and process constraint conditions for balancing on two strands so as to synchronize the consumptions of molten steel of two strands, then, proceeding to step 5-1-10; or else, returning to perform step 5-1-4; and step 5-1-10, if performing steps 5-1-3 to 5-1-9 for the weight of all ordered slabs in all batches and obtaining a batching scheme of orders for all combinations of steel grades and widths have been finished, then proceeding to step 5-2, or else continuing to perform steps 5-1-3 to 5-1-9;

step 5-2, using the established real matrix as a controlled object to obtain a final optimization batching scheme based on a multi-object parallel iterative improvement strategy, including the steps of:

step 5-2-1, randomly generating NP real matrices with the same structure as the real matrix described in step 5-1-1, putting all the constructed real matrices in a set, setting elements meeting objective steel grade and objective width in each matrix to be 1, and setting elements not meeting objective steel grade and objective width in each matrix to be 0, wherein NP is pre-set population size based on a multi-object parallel iterative improvement strategy algorithm;

step 5-2-2, returning all the generated real matrices to perform steps 5-1-1 to 5-1-10, establishing a corresponding relationship between each real matrix and the batching scheme, obtaining values of decision variables according to the batching scheme, and substituting the values into the objective function so as to obtain an objective function corresponding to each real matrix;

step 5-2-3, sequencing the obtained objective functions from small to large, dividing the real matrices in the first half of the ranking into one group, and dividing those in the second half of the ranking into the other group;

step 5-2-4, performing mutation operation and cross operation on each real matrix according to the grouping to which the objective function corresponding to each real matrix belongs, to obtain the real matrices after cross operation, then returning all the real matrices after cross operation to perform steps 5-1-1 to 5-1-10, establishing a corresponding relationship between each real matrix after operation and the batching scheme, obtaining values of decision variables according to the batching scheme, and substituting the variables into the objective function to obtain an objective function corresponding to each real matrix after operation;

step 5-2-5, determining the size of the objective function corresponding to the real matrices before and after operation, selecting the real matrices with smaller objective functions as updated real matrices to obtain an updated matrix set, and returning to perform steps 5-2-2 to 5-2-4 until the matrix set is no longer updated, so as to obtain a final matrix set; and step 5-2-6, selecting the real matrix with the smallest objective function value from the final matrix set, and returning such matrix to perform steps 5-1-1 to 5-1-10 so as to obtain the final optimization batching scheme;

step 5-3, merging the obtained steelmaking batches according to the steel grade and the width, merging the steelmaking batches with the same steel grade and width into a campaign, to complete specifying the pre-batching scheme of the subset of small orders in the continuous casting procedure; then performing step 7;

step 6, developing a batching scheme in the steelmaking procedure and a pre-batching scheme in the continuous casting procedure of the subset of large orders;

step 7, determining a scheduling decision of a campaign on the continuous casting equipment by constructing a quantitative mathematical model, including: selecting decision variables for the campaign scheduling; quantitatively describing objectives pursued by the campaign scheduling; and quantitatively describing process constraints and management requirements to be followed by the campaign scheduling, wherein the step 7 includes the following steps of:

step 7-1, selecting the decision variables for the campaign scheduling;

step 7-2, quantitatively describing objectives pursued by the campaign scheduling, including: maximizing the utilization of tundishes, minimizing the number of continuously cast slabs in different steel grades, minimizing the number of slabs with adjusted width, minimizing inventory deviations of warm rolls, minimizing inventory deviations of hard rolls, minimizing deviations in demand for hot rolling and cold rolling in all flow directions, and minimizing delay time of the customers' orders; and step 7-3, quantitatively describing process constraints and management requirements to be followed by establishing of the campaign scheduling, including: assignment relation constraints and feasible assignment rule constraints of the campaigns on the continuous casting equipment;

step 8, taking the mathematical model established in step 7 as a basis for quantitative calculation, and obtaining a scheduling scheme of the campaign on the continuous casting equipment based on the multi-object parallel iterative improvement strategy by establishing a mutual mapping relationship between the real vectors and the scheduling scheme of the campaign on the continuous casting equipment, and using the established real vectors as the controlled object, obtaining the assignment and sequence of the campaign for the continuous casting equipment; and step 9, adjusting, issusing and executing an integration scheme of batching and scheduling.

Step 4-1 performs the step of mapping a multi-product batching scheme in the steelmaking production course into decision variables for the mathematical model, including the following steps of:

setting a continuous decision variable $x_{igwk}$ to represent the weight of production slabs with steel grade g and width w in the $k^{th}$ batch of order i; setting an integer decision variable $z_{igwk}$ to represent the number of the production slabs with steel grade g and width w in the $k^{th}$ batch of order i; setting an integer decision variable $z_{0gwk}$ to represent the number of open-ordered slabs with steel grade g and width w in the $k^{th}$ batch; setting 0-1 decision variable $y_{gwk}$ which takes the value of 1 when the $k^{th}$ batch with steel grade g and width w is decided to be produced, or else, $y_{gwk}$ takes the value of 0;

in step 4-2-1, establishing process constraints for substitution relationship of the product steel grades, for any steel grade g, determining a product set $N_g$ produced with the steel grade;

$$N_g = \{i \in N | s_{g_i g} \neq 0\}, \forall g \in G \tag{1}$$

wherein N represents the total product set for a given subset of small orders, $g_i$ represents the steel grade of product i, $G = \cup_{i \in N} g_i$ represents the set of all steel grades contained in the product set N, and $s_{g_i g}$ represents the substitute relationship between the steel grade $g_i$ of product i and any steel grade g;

in step 4-2-2, establishing process constraints for the casting width ranges of the products on the continuous casting equipment, for any width w set for a crystallizer of the continuous caster, determining the slabs to be cast into the product set $P_w$ with such width;

$$P_w = \{i \in N | d_i^{min} \leq w \leq d_i^{max}\}, \forall w \in W \tag{2}$$

wherein $W = \cup_{i \in N} d_i^{max}$ represents the total width set required for the crystallizer of the continuous caster during casting of the product set N; $d_i^{max}$ and $d_i^{min}$ respectively represent the maximum and minimum casting width allowed by product i;

in step 4-2-3, establishing process constraints for smelting capacity limit of each batch of the converter, which requires the total weight of the slabs required by the customers' orders and open-ordered slabs limited within the same batch of smelting is larger or less than the standard smelting capacity of the converter by the weight of one slab or less, with the specific formulas as follows:

$$\sum_{i \in N_g \cap N_w} x_{igwk} + z_{0gwk} l^{std} w h^{std} \rho + \delta_{gwk}^+ - \delta_{gwk}^- = C y_{gwk}, \tag{3}$$

$$\forall g \in G, w \in W, k \in \{1, 2, \ldots, K_{gw}\}$$

$$z_{igwk} \delta_{gwk}^+ \leq x_{igwk}, \forall g \in G, w \in W, k = \{1, 2, \ldots, K_{gw}\}, \tag{4}$$
$$i \in N_g \cap P_w$$

$$z_{igwk} \delta_{gwk}^- \leq x_{igwk}, \forall g \in G, w \in W, k = \{1, 2, \ldots, K_{gw}\}, \tag{5}$$
$$i \in N_g \cap P_w$$

wherein C represents the standard smelting capacity of the converter, $Q_i$ represents the unfulfilled quantity of product i, $$K_{gw} = \left\lceil \sum_{i \in N_g \cap P_w} Q_i / C \right\rceil \quad (5)$$

represents the upper limit of the batch number with steel grade g and width w, $\delta_{gwk}^+$ represents a part below the standard smelting capacity of the converter, of the batch, $\delta_{gwk}^-$ represents a part over the standard smelting capacity of the converter, of the batch, $l^{std}$ represents the standard length of the open-ordered slabs in the continuous casting production, $h^{std}$ represents the standard thickness of the open-ordered slabs in the continuous casting production, and ρ represents the density of the molten steel;

step 4-2-4, establishing process constraints for balancing on two strands so as to synchronize the consumptions of molten steel of two strands during casting of each furnace of molten steel on the continuous caster, requiring that casting times of two strands of the same furnace of molten steel on the continuous caster need to be equal to each other, which is mapped on the model as equal number of slabs cast from the two strands, with the specific formula as follows:

$$\sum_{i \in N_g \cap P_w} z_{igwk} + z_{0gwk} + 2n_{gwk}, \quad (6)$$

$$\forall g \in G, w \in W, k = \{1, 2, \ldots, K_{gw}\}$$

wherein $n_{gwk}$ represents an auxiliary integer variable, indicating the number of slabs produced by the odd strand of the $k^{th}$ batch having steel grade g and width w;

in step 4-2-5, establishing process constraints for cutting length ranges of slabs on the continuous casting equipment, under limits by the cutting process of the continuous caster and length ordered by customers, requiring that the lengths of any slabs cast from one furnace of molten steel need to be within a specified range, with the specific formula as follows:

$$l_i^{min} \le x_{igwk}/z_{igwk}wh_i\rho \le l_i^{max}, \quad \forall g \in G, \ w \in W, \ k=\{1, 2, \ldots K_{gw}\}, \ i \in N_g \cap P_w, \quad (7)$$

wherein $h_i$ represents the slab thickness required for product i, while $l_i^{max}$ and $l_i^{min}$ represent the maximum and minimum slab length required by product i;

in step 4-2-6, constructing flexible management constraints for customers' order quantities, requiring that the part below or beyond a quantity ordered by the customer needs to be less than the weight of one slab;

$$\sum_{g,l,k} x_{iglk} + \theta_i^+ - \theta_i^- = Q_i \forall \, i \in N \quad (8)$$

$$z_{igwk}\theta_i^+ \le x_{igwk} \forall \, g \in G, w \in W, k \in \{1, 2, \ldots, K_{gw}\}, \quad (9)$$
$$i \in N_g \cap P_w$$

$$z_{igwk}\theta_i^- \le x_{igwk} \forall \, g \in G, w \in W, k \in \{1, 2, \ldots, K_{gw}\}, \quad (10)$$
$$i \in N_g \cap P_w$$

wherein $\theta_i^+$ represents the insufficient part of the unfullfilled quantity, and $\theta_i^-$ represents the excessive part of the unfullfilled quantity;

the objective function described in step 4-3 is shown as follows:

$$F_0 = \lambda_1 \sum_{g \in G} \sum_{w \in W} \sum_{k=1,\ldots,K_{gw}} l^{std} w h^{std} \rho z_{0gwk} + \quad (11)$$

$$\lambda_2 \sum_{i \in N} \sum_{g \in G} \sum_{w \in W} \sum_{k=1,\ldots,K_{gw}} s_{g_i g} x_{igwk} +$$

$$\lambda_3 \sum_{g \in G} \sum_{w \in W} \sum_{k=1,\ldots,K_{gw}} (\delta_{gwk}^+ + \delta_{gwk}^-) + \lambda_4 \sum_{i \in N} (\theta_i^+ + \theta_i^-)$$

wherein $F_0$ represents the total cost for production batching of the subset of small orders, which is the linear aggregation of: the total quantity of open-ordered slabs of all batches, the upgrade quantity between different steel grades, deviation ordered quantity of all the customers' orders, and deviation quantity of the standard smelting capacity of the converter, $\lambda_1, \lambda_2, \lambda_3, \lambda_4 \in [0, 1]$ representing the weight coefficients of different objectives, and $\lambda_1+\lambda_2+\lambda_3+\lambda_4=1$.

The real matrix described in step 5-1-1 is shown as the following specific formula:

$$A = \begin{pmatrix} a_{111} & a_{112} & \cdots & a_{11,|W|} & a_{121} & a_{122} & \cdots & a_{12,|W|} & \cdots & a_{1,|G|,1} & a_{1,|G|,2} & \cdots & a_{1,|G|,|W|} \\ a_{211} & a_{212} & \cdots & a_{21,|W|} & a_{221} & a_{222} & \cdots & a_{22,|W|} & \cdots & a_{2,|G|,1} & a_{2,|G|,2} & \cdots & a_{2,|G|,|W|} \\ \vdots & \vdots & \vdots & \vdots & \vdots & \vdots & \vdots & \vdots & \vdots & \vdots & \vdots & \vdots & \vdots \\ a_{|N|,11} & a_{|N|,12} & \cdots & a_{|N|,1,|W|} & a_{|N|,11} & a_{|N|,22} & \cdots & a_{|N|,2,|W|} & \cdots & a_{|N|,|G|,1} & a_{|N|,|G|,2} & \cdots & a_{|N|,|G|,|W|} \end{pmatrix} \quad (12)$$

wherein A represents a $|N| \times (|G| \times |W|)$-dimension real matrix, N represents a total product set of a given subset of small orders, W represents a set of all possible widths required to be set for the crystallizer of the continuous caster during casting of product set N, and $a_{|N|,|G|,|W|}$ represents the ratio of the weight of the slabs in all batches corresponding to the order N with steel grade G and width W to the unfulfilled quantity of the order N.

Step 5-1-2 performs the step of obtaining the weight of the slabs with the objective steel grade and the objective width, in all batches, set in a certain order, and the weight of the slabs with the objective steel grade and the objective width, in all batches, with the specific calculation formulas as follows:

$$b_{igw} = \frac{a_{igw}Q_i}{\sum_{g \in G} \sum_{w \in W} a_{igw}} \quad (13)$$

$$B_{gw} = \sum_{i \in N} b_{igw} \quad (14)$$

wherein $b_{igw}$ represents the weight of the slabs with the objective steel grade g and the objective width w, in all batches, set in the order i, $B_{gw}$ represents the weight of all the ordered slabs with steel grade g and width w, in all batches, $a_{igw}$ represents the ratio of the weight of the slabs with steel grade g and width w, in all batches, set in the order i, to unfulfilled quantity of order i, and $Q_i$ represents the unfulfilled quantity of product i.

Step 5-1-5 performs the step of replacing the unfulfilled quantity of a corresponding product in the flexible management constraints for the customers' order quantities with the slab weight of the product, replacing the unfulfilled quantity of product i in formula $$\sum_{g,l,k} x_{iglk} + \theta_i^+ - \theta_i^- = Q_i \forall\, i \in N$$

with slab weight $b_{igw}$ of the product;

in step 5-1-6, replacing the unfulfilled quantity of a corresponding product in the flexible management constraints for the customers' order quantities with the remaining capacity, replacing the unfulfilled quantity of product i in formula $$\sum_{g,i,k} x_{iglk} + \theta_i^+ - \theta_i^- = Q_i \forall\, i \in N$$

with the remaining capacity $C-E_k$, wherein C represents the standard smelting capacity of the converter, and $E_k$ represents the weight of the slabs contained in the batch.

Step 5-2-4 performs the step of performing mutation operation and cross operation on each real matrix according to the grouping of the objective function corresponding to each real matrix, including the following steps of:

step 5-2-4-1, selecting three real matrices $A^{r1}$, $A^{r2}$ and $A^{r3}$ which are different from the objective real matrix $A^j$ and are different from each other from the set $\{A^1, A^2, \ldots, A^{NP}\}$ consisting of the real matrices, $j \neq r1 \neq r2 \neq r3$;

step 5-2-4-2, randomly generating a mutation step length factor $F_j$ from an evenly distributed real interval [j/NP, 1];

step 5-2-4-3, performing differential operation on the real matrices $A^j$, $A^{r1}$, $A^{r2}$ and $A^{r3}$, to obtain a real matrix $V^j$ after the mutation operation;

$$V^j = A^j + \begin{cases} F_0(A^{r1} - A^j) + F_0(A^{r2} - A^{r3}), & A^j \in S' \\ F_0(A^{r*} - A^j) + F_0(A^{r2} - A^{r3}), & A^j \in I \end{cases} \quad (15)$$

wherein $A^{r*}$ is the real matrix currently with the smallest current objective function value, and $f(A^{r*}) = \min\{f(A^j)|j=1, 2, \ldots, NP\}$ is met; S' represents the grouping of the real matrices in the first half of the ranking when sequencing the obtained objective functions from small to large, and I represents the grouping of those in the second half of the ranking;

step 5-2-4-4, randomly generating a cross probability factor $CR_{igw}$ for each element of the matrix from the evenly distributed real interval [j/NP, 1];

step 5-2-4-5, performing cross operation on each pair of real matrices $A^j$ and $V^j$ to generate a real matrix $U^j$;

$$u_{igw}^j = \begin{cases} v_{igw}^j, & \text{if } (rand_{igw}^j(0,1) < CR_{igw}), \\ a_{igw}^j, & \text{else} \end{cases} \quad (16)$$

wherein $u_{igw}^j$ represents an element in the real matrix $U^j$, $v_{igw}^j$ represents an element in the real matrix $V^j$, $a_{igw}^j$ represents an element in the real matrix $A^j$, $j=1, 2, \ldots, NP$, $i \in N$, $w \in W$, $k \in \{1, 2, \ldots, K_{gw}\}$; w represents a set of all possible widths required for the crystallizer of the continuous caster during casting of product set N; $K_{gw}$ represents the upper limit of the number of batches with steel grade g and width w; and $rand_{igw}^j(0,1)$ represents random numbers obeying normal distribution between (0, 1);

step 5-2-4-6, judging whether element $u_{igw}^j < L$ or $u_{igw}^j > U$, if yes, treating boundary conditions for the real matrix $U^j$, or else, completing the cross operation;

with the specific formula as follows:

$$u_{igw}^j = L + rand_{igw}^j(0,1)(U-L) \quad (17)$$

wherein L represents the lower limit of the value range of element $u_{igw}^j$, and U represents the upper limit of the value range of element $u_{igw}^j$.

Step 7-1 performs the step of selecting the decision variables for the campaign scheduling, including the following steps of:

setting 0-1 decision variable $u_{rls}$ to represent whether campaign r is assigned at the first position of the continuous casting equipment s; setting auxiliary variable $Q_{ls}$ to represent the casting completion time of a campaign at the first position of the continuous casting equipment s; setting auxiliary variable $T_r$ to represent the casting completion time of the campaign r; setting auxiliary variable $t_i$ to represent the casting completion time of order i; setting auxiliary variable $I_{hd}^{warm}$ to represent a planned inventory for warm rolls in a front warehouse of a hot rolling plant h on the $d^{th}$ day; setting auxiliary variable $I_{hd}^{hard}$ to represent a planned inventory for the hard rolls in front warehouse of a hot rolling plant h on the $d^{th}$ day; and setting auxiliary variable $\Delta_{fd}$ to represent the quantity of slabs planned to be produced by a steelmaking plant on the $d^{th}$ day for flow direction $f$;

step 7-2 performs the step of maximizing the utilization of tundishes, requiring that the number of tundishes used after the casting of all campaigns needs to be the minimum, with the specific formula as follows:

$$F_1 = \sum_{s \in S} \left( \left\lceil \frac{\sum_{l=1}^{l_1-1} \sum_{r \in R} a_r u_{rls}}{Tun^{max}} \right\rceil + \sum_{\tau \in \{1,2,\ldots,b_s-1\}} \left( \left\lceil \frac{\sum_{l=l_\tau}^{l_{\tau+1}-1} \sum_{r \in R} a_r u_{rls}}{Tun^{max}} \right\rceil \right) + \left( \left\lceil \frac{\sum_{l=l_{b_s}}^{|R|} \sum_{r \in R} a_r u_{rls}}{Tun^{max}} \right\rceil \right) \right) \quad (18)$$

wherein $F_1$ represents the total cost of the tundishes updated for all campaign scheduling; S represents a set of continuous casting equipment; R represents a set of all campaigns; $a_r$ represents the number of heats contained in campaign r; $Tun^{max}$ represents the maximum number of heats that can be cast in one tundish; $b_s$ represents the number of batches which cannot be cast continuously on the continuous casting equipment s; $l_\tau$, $\forall \tau \in \{1, 2, \ldots, b_s\}$ represents the position of the $\tau^{th}$ batch which cannot be cast with steel grade change;

step 7-2 performs the step of minimizing the number of continuously cast slabs with different steel grades, with the specific formula as follows:

$$F_2 = \sum_{s \in S} \left( \sum_{l=1}^{l_1-2} f\left(g_{\sum_{r \in R} ru_{rls}}, g_{\sum_{r \in R} ru_{r,l+1,s}}\right) + \sum_{\tau \in \{1,2,\ldots,b_s-1\}} \sum_{l=l_\tau}^{l_{\tau+1}-2} f(g_{\sum_{r \in R} ru_{rls}}, g_{\sum_{r \in R} ru_{rl+1s}}) + \sum_{l=l_{b_s}}^{|R|-1} f(g_{\sum_{r \in R} ru_{rls}}, g_{\sum_{r \in R} ru_{rl+1s}}) \right) \quad (19)$$

wherein $F_2$ represents the total cost for continuous casting of all different steel grades in campaign scheduling;

$$\sum_{r \in R} ru_{rls}$$

represents the campaigns assigned at the first position of the continuous casting equipment s, and $$g_{\sum_{r \in R} ru_{rls}}$$

represents the steel grade of campaign $$\sum_{r \in R} ru_{rls};$$

step 7-2 performs the step of minimizing the number of slabs with adjusted width,
with the specific formula:

$$F_3 = \sum_{s \in S} \left( \sum_{l=1}^{l_1-2} h\left(w_{\sum_{r \in R} ru_{rls}}, w_{\sum_{r \in R} ru_{r,l+1,s}}\right) + \sum_{\tau \in \{1,2,\ldots,b_s-1\}} \sum_{l=l_\tau}^{l_{\tau+1}-2} h(w_{\sum_{r \in R} ru_{rls}}, w_{\sum_{r \in R} ru_{rl+1s}}) + \sum_{l=l_{b_s}}^{|R|-1} h(w_{\sum_{r \in R} ru_{rls}}, w_{\sum_{r \in R} ru_{rl+1s}}) \right) \quad (20)$$

wherein $F_3$ represents the total cost of all width adjustment for campaign scheduling;

$$w_{\sum_{r \in R} ru_{rls}}$$

represents the width of campaign $$\sum_{r \in R} ru_{rls};$$

it the two parameters are the same, the function h(.) is 0, or else, the function h(.) is 1;

step 7-2 performs the step of minimizing inventory deviations of warm rolls,
requiring that the deviation between planned inventory for the warm rolls in a hot-rolling front warehouse and the objective inventory needs to be the minimum to ensure the smooth production of hot rolling,
with the specific formula as follows:

$$F_4 = \sum_{h \in H} \sum_{d \in D} |I_{hd}^{warm} - \bar{I}_{hd}^{warm}| \quad (21)$$

wherein $F_4$ represents the risk cost of all warm roll inventories; H represents a set of hot rolling mills, D represents a set of days in a planned period, and $\bar{I}_{hd}^{warm}$ represents the objective inventory of the warm rolls required for the hot rolling plant h on the $d^{th}$ day;
step 7-2 performs the step of minimizing inventory deviations of hard rolls,
requiring that the deviations between the planned inventory for the hard rolls in the hot-rolling front warehouse and the allowed maximum and minimum inventories of the hard rolls need to be the minimum, so as to reduce material flow blockage due to excessive hard rolls,
with the specific formula as follows:

$$F_5 = \sum_{h \in H} \sum_{d \in D} \max(I_{hd}^{hard} - \bar{I}_{hd}^{hard}, 0) + \max(\underline{I}_{hd}^{hard} - I_{hd}^{hard}, 0) \quad (22)$$

wherein $F_5$ represents the risk cost of all difficult roll inventories; $\bar{I}_{hd}^{hard}$ represents the maximum hard roll inventory in the hot rolling plant h on the $d^{th}$ day; $\underline{I}_{hd}^{hard}$ represents the allowed minimum hard roll inventory in the hot rolling plant h on the $d^{th}$ day;
step 7-2 performs the step of minimizing delay time of the customers' orders,
with the specific formula as follows:

$$F_6 = \sum_{i \in N^R} \max(t_i - Due_i, 0) + \max(Ear_i - t_i, 0) \quad (23)$$

wherein $F_6$ represents satisfaction degree gains of the customers' orders; $N^R$ represents a set of orders with delivery date requirements, $Ear_i$ represents the earliest delivery date of order i, and $Due_i$ represents the latest delivery date of order i;
step 7-3 performs the step of quantitatively describing process constraints and management requirements to be followed by the campaign scheduling, including the following steps of:
creating assignment relation constraints of campaigns on the continuous casting equipment, requiring that each campaign can only be assigned to one position on the continuous casting equipment, and each position on each piece of continuous casting equipment can only be assigned with one campaign, non-assigned positions on each continuous casting equipment are behind positions assigned with the campaigns, with the specific formulas as follows:

$$\sum_{s \in S} \sum_{l=1}^{|R|} u_{rls} = 1, \forall r \in R \quad (24)$$

-continued $$\sum_{r \in R} u_{rls} \leq 1, s \in S, l \in \{1, 2, \ldots, |R|\} \quad (25)$$

$$\sum_{r \in R} u_{r,l+1,s} \leq \sum_{r \in R} u_{rls}, s \in S, l \in \{1, 2, \ldots, |R|-1\} \quad (26)$$

creating feasible assignment rule constraints, allowing a campaign to be assigned onto the continuous casting equipment only when order manufacturing procedures contained in the campaign are compatible with the given continuous casting equipment, with the specific formula as follows;

$$u_{rls} \leq v_{rs} \quad (27)$$

in the formula, $v_{rs}$ represents a compatibility parameter between the order manufacturing procedures contained in the campaign r and continuous casting equipment s, $v_{rs} \in \{0, 1\}$.

Step 8 performs the step of establishing a mutual mapping relationship between the real vectors and the scheduling scheme of the campaigns on the continuous casting equipment, including the steps of:

step 8-1, setting a 2|R|-dimension real vector PP=[$a_1$, $a_2 \ldots a_{|R|}|b_1, b_2 \ldots b_{|R|}$], and determining the value of each component of the real vector PP, wherein $a_r$ and $b_r$ are dimensionless real parameters in the range of [0, 1]; $1 \leq r \leq |R|$, wherein R represents a set of all campaigns;

step 8-2, determining set Rs of campaigns assigned to any continuous casting equipment s according to the $b_r$ value;

$$R_s = \left\{ v_{rs} = 1, \frac{\sum_{s'=1}^{s} v_{rs'} - 1}{\sum_{s'=1}^{|S|} v_{rs'}} < b_r \leq \frac{\sum_{s'=1}^{s} v_{rs'}}{\sum_{s'=1}^{|S|} v_{rs'}} \middle| r \in R \right\};$$

step 8-3, determining the sequence of all campaigns assigned to any continuous casting equipment s according to the $a_r$ value;

sequencing batch set Rs by the $a_r$ value from small to large, to determine the sequence of all the campaigns assigned to the continuous casting equipment s.

The present invention has the advantages that the present invention proposes a method of batching and scheduling for steelmaking production with plant-wide process consideration. The method disclosed by the present invention includes the following steps of: in the level of process and technique, by detailed characterization of the diversification properties of products, the batch production property of equipment and suitability between products and equipment, establishing a mathematical model for quantitatively describing the decision problem of batching on steelmaking and continuous casting procedures; based on this model, designing a multi-object based parallel iterative improvement method to obtain a batching scheme on the steelmaking procedure; in the level of production organization, starting from the production capacity balance between parallel equipment of the same procedure, and material flow linkage between upstream and downstream procedures, establishing a model for the assignment and sequencing of batches on the continuous casting equipment and the time dimension; based on this model, designing a serial iterative improvement method based on neighborhood search to obtain the production scheduling scheme of batches on the continuous casting equipment and the time dimension; integrating the batching plan with the production scheduling scheme, making further refinement, and issuing the plan to all production and manufacturing units at the steelmaking stage, which prepare materials and conduct production according to the scheme, so that steel material flow is evenly and punctually distributed in the equipment and the time dimensions in the procedures of the plant-wide process. The present invention improves the product quality, increases the material yield, resource utilization rate and equipment operation efficiency, realizes the load balance on the parallel equipment and smooth material linkage between serial equipment, reduces the material flow transportation jam, downstream equipment waiting time and inventory, and realizes reasonable control of inventory.

DETAILED DESCRIPTION OF THE PREFERRED EMBODIMENT

The method disclosed by the present invention will now be described in further detail in connection with an embodiment and the accompanying drawings.

The embodiment is a large iron and steel enterprise having two steelmaking plants, two hot rolling plants, and one cold-rolled product line containing eight units respectively for acid pickling, acid rolling, continuous annealing, hot-dipped galvanizing, hot-dipped Al—Zn, tin electroplating, cross cutting, and recoiling; the first steelmaking plant is equipped with three converters, two RH, two LF and two pieces of Ar refining equipment, and two continuous casters with a casting width range of 750-1320 mm, wherein each converter has a standard steel smelting capacity of 150 tons, and one tundish can be cast into 8 heats to the maximum; the second steelmaking plant is equipped with two converters, one RH, one LF and one pieces of Ar refining equipment, and two continuous caster with a casting width range of 900-1650 mm, wherein each converter has a standard steel smelting capacity of 250 tons, and one tundish can be cast into 8 heats to the maximum;

order data from a week of actual production in some iron and steel enterprise, in which the total production quantities owed of orders corresponds to different stages and the production procedures are shown as follows:

| Item | Relationship between steelmaking and hot rolling material flow | | | | | |
|---|---|---|---|---|---|---|
| | Flowing through two steelmaking plants | Flowing through only the first steelmaking plant | Flowing through only the second steelmaking plant | Refining method | | |
| | | | | RH | LF | AR |
| Hot-rolling direction order | 44572 | 34379 | 55847 | 1100 | 24000 | 960 |
| Cold-rolling direction order | 18685 | 5959 | 1767 | 15000 | 36000 | 108 |
| Acid pickling direction order | 6622 | 1479 | 48266 | 44000 | 27700 | 63000 |

Figure 1:
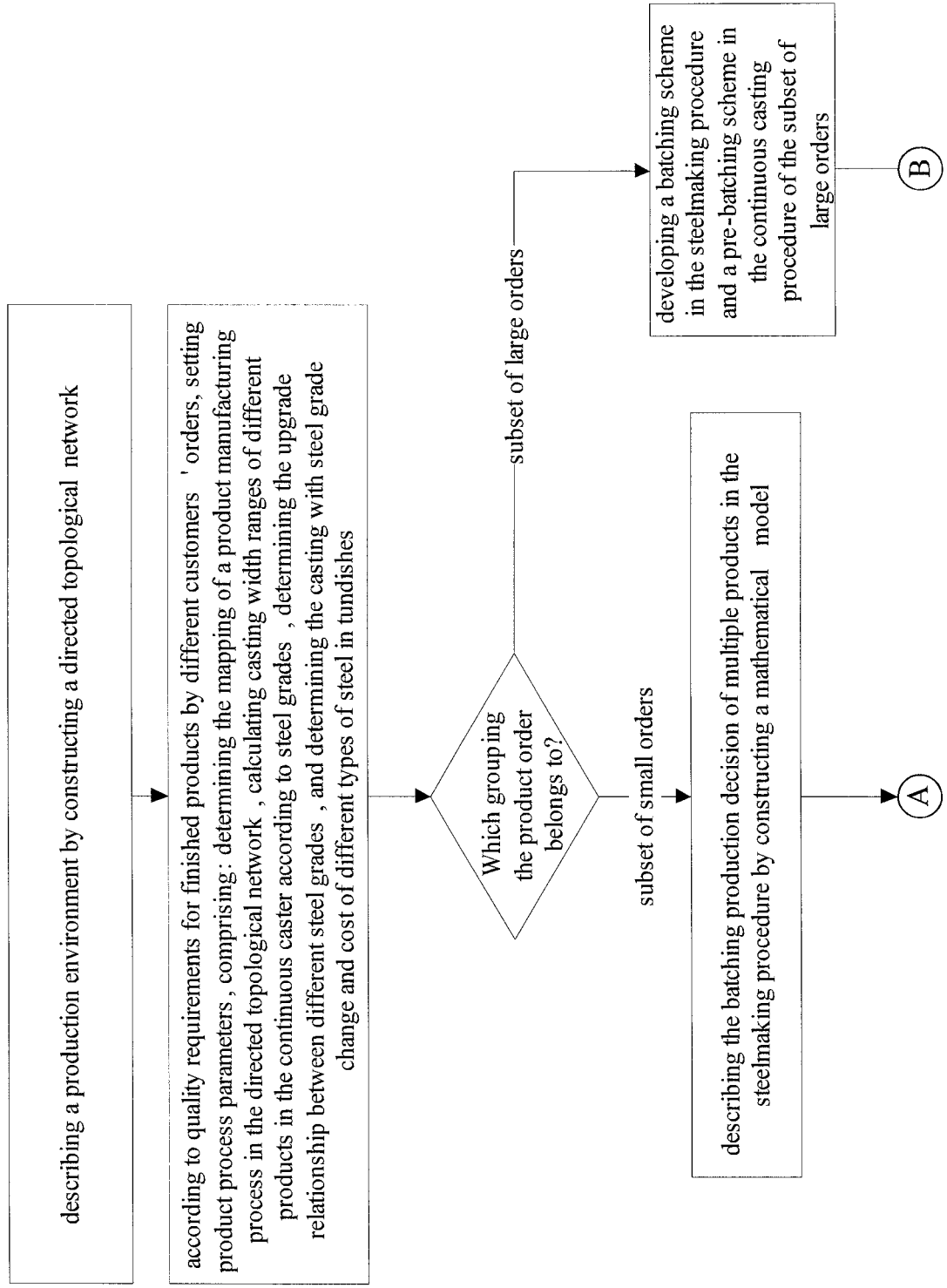
FIG. 1 is a flow chart of a method of batching and scheduling for steelmaking production with plant-wide process consideration according to an embodiment of the present invention.
Figure 1:
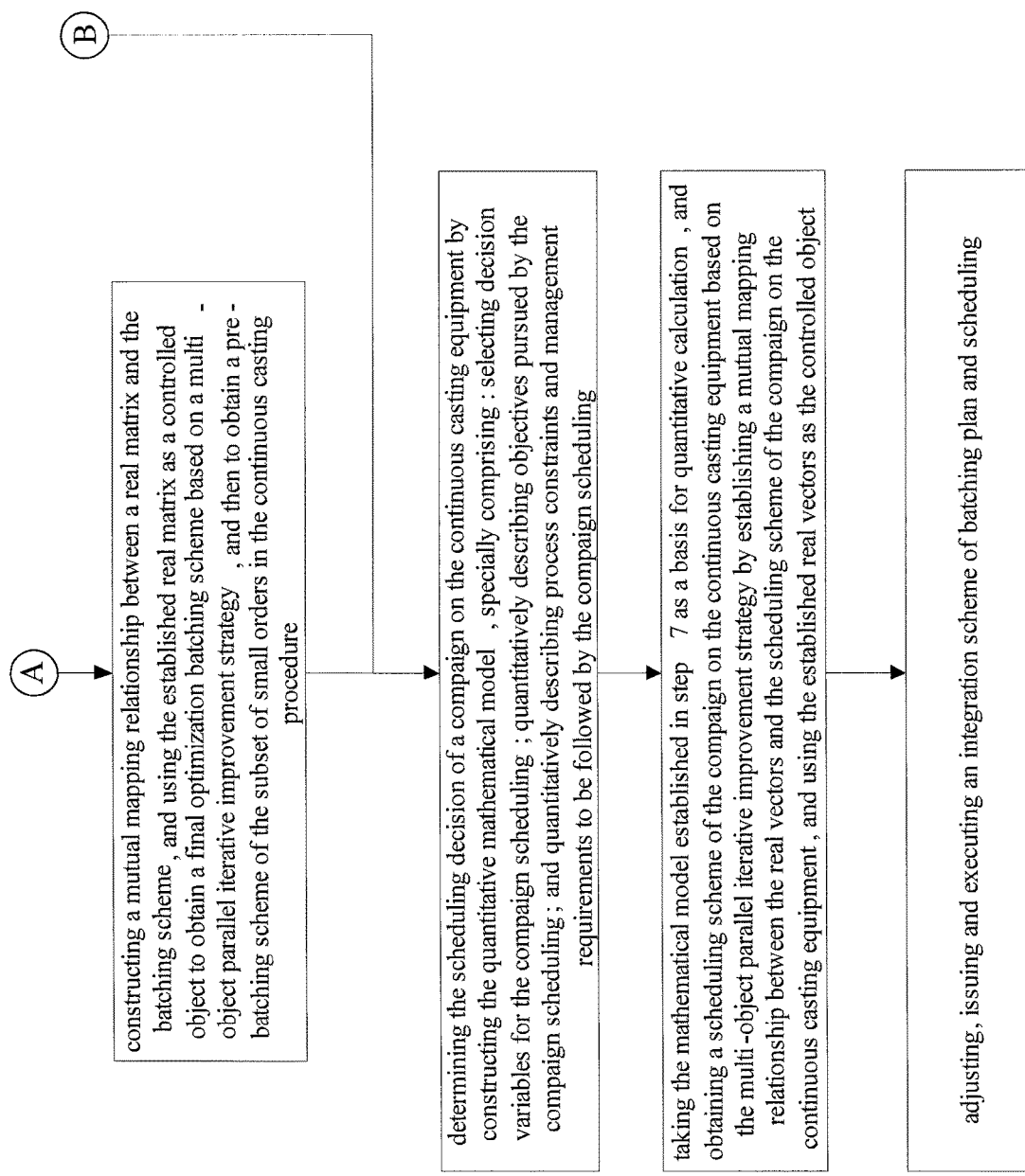
Figure 2:
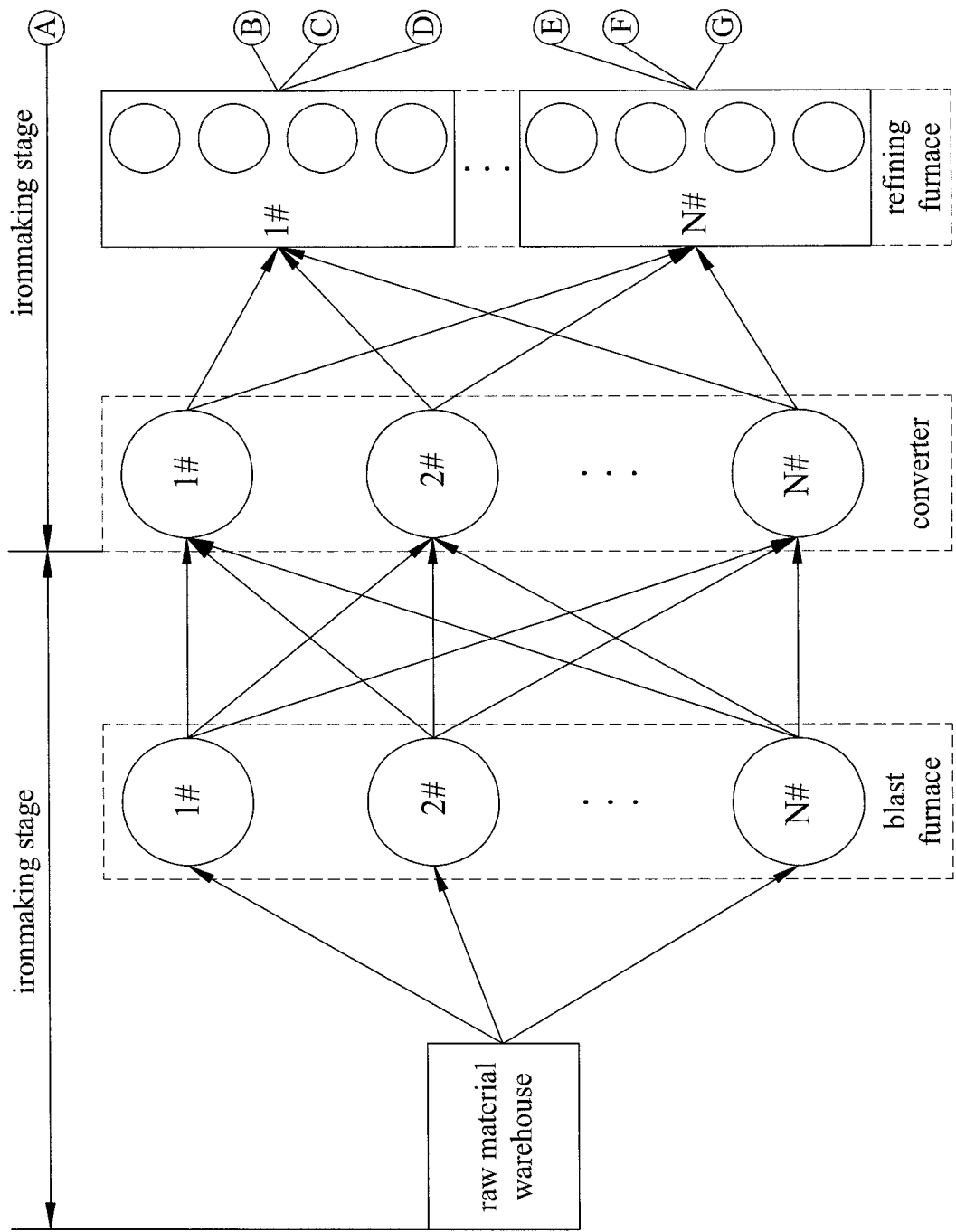
FIG. 2 is a directed topological network according to an embodiment of the present invention.
Figure 2:
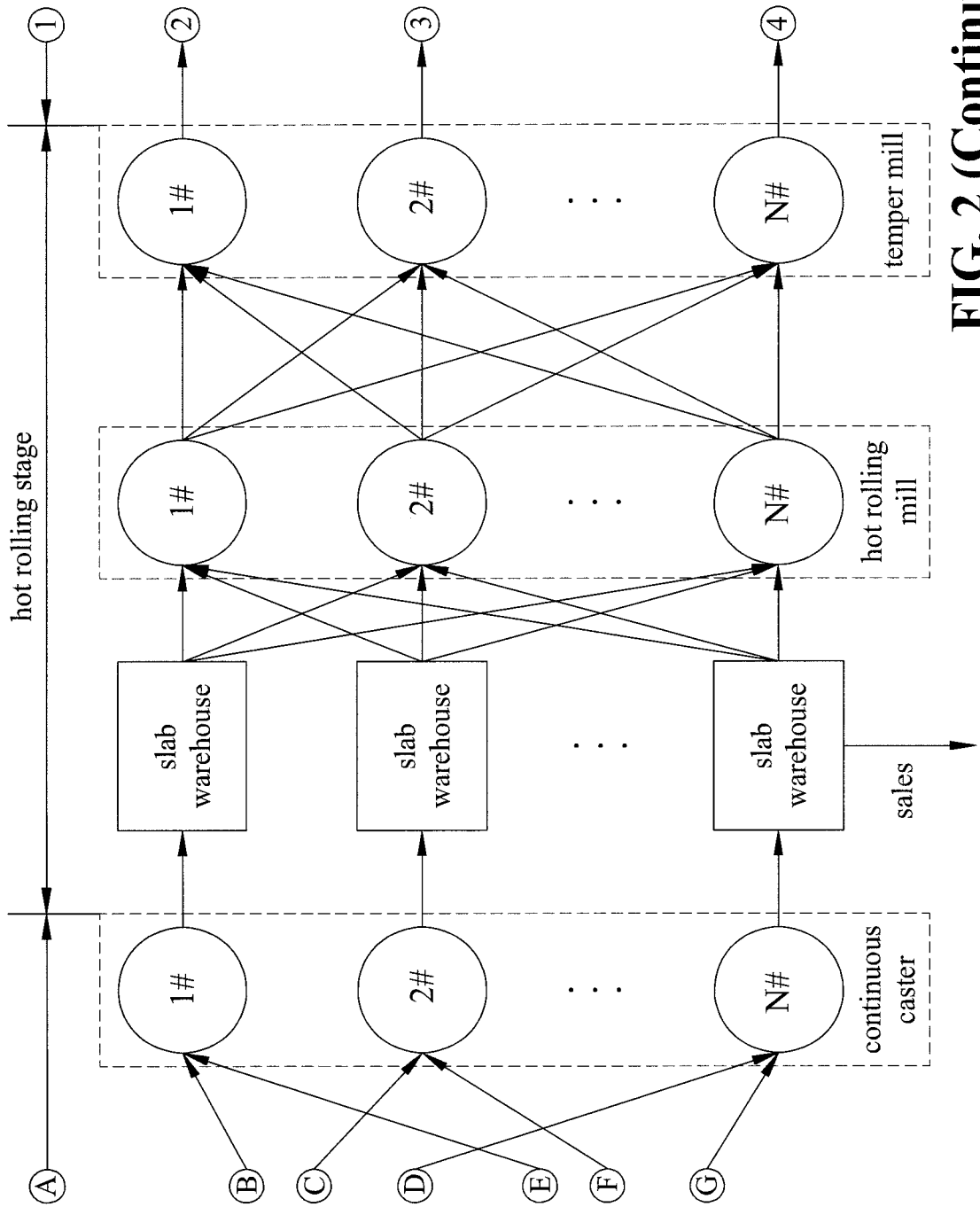
Figure 2:
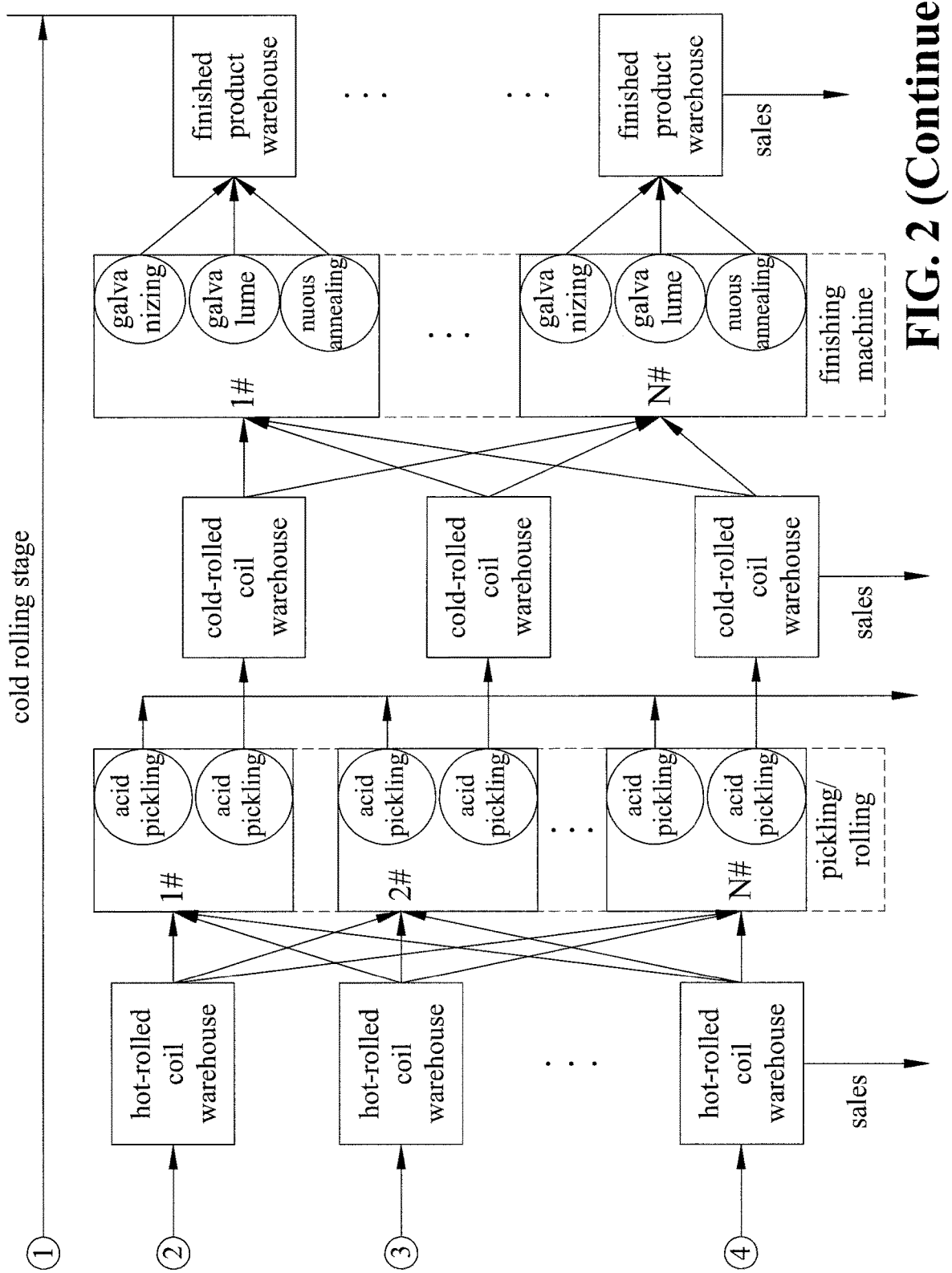
Figure 3:
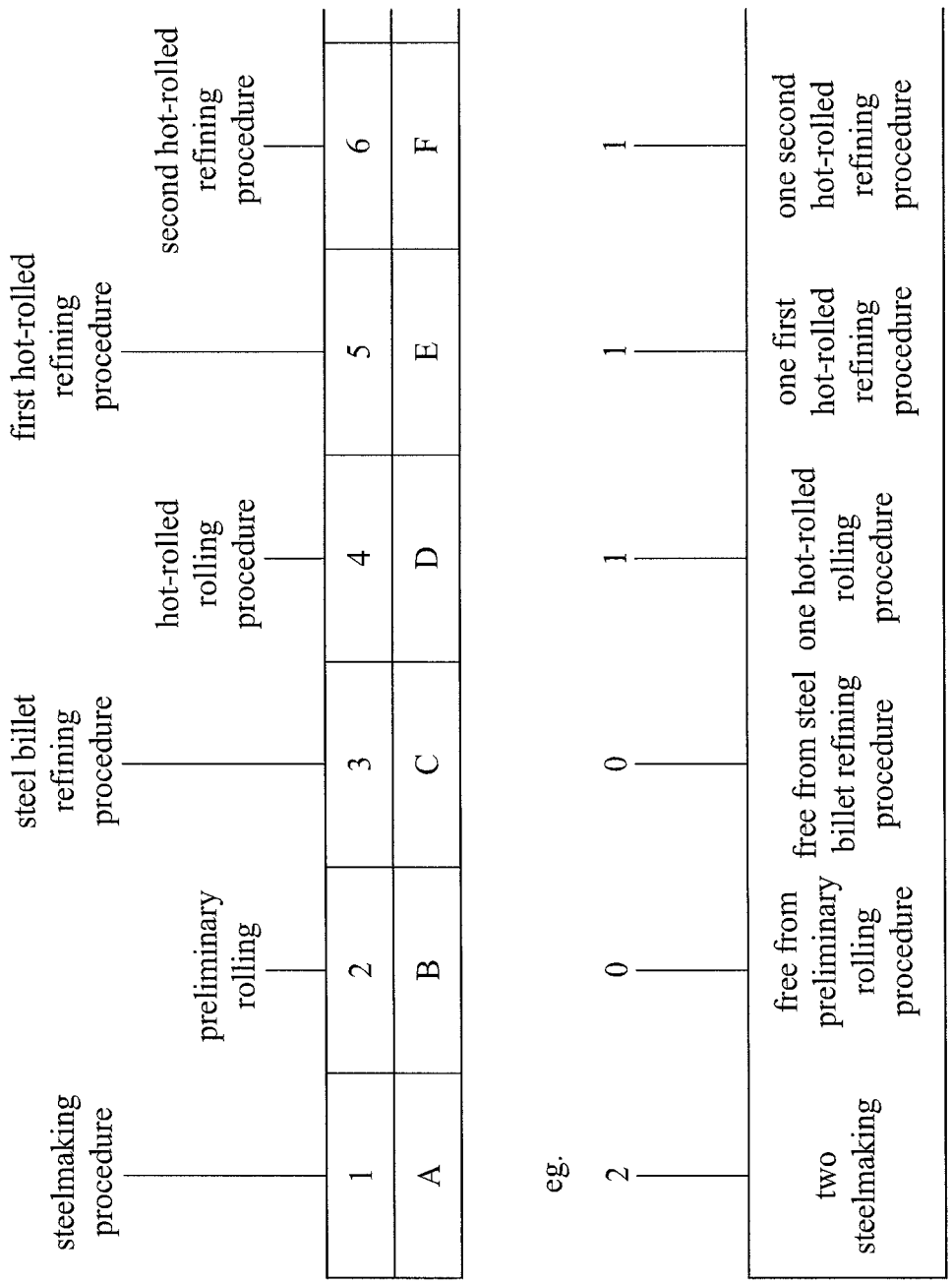
FIG. 3 is a schematic diagram of code composition of a manufacturing process according to an embodiment of the present invention.
Figure 3:
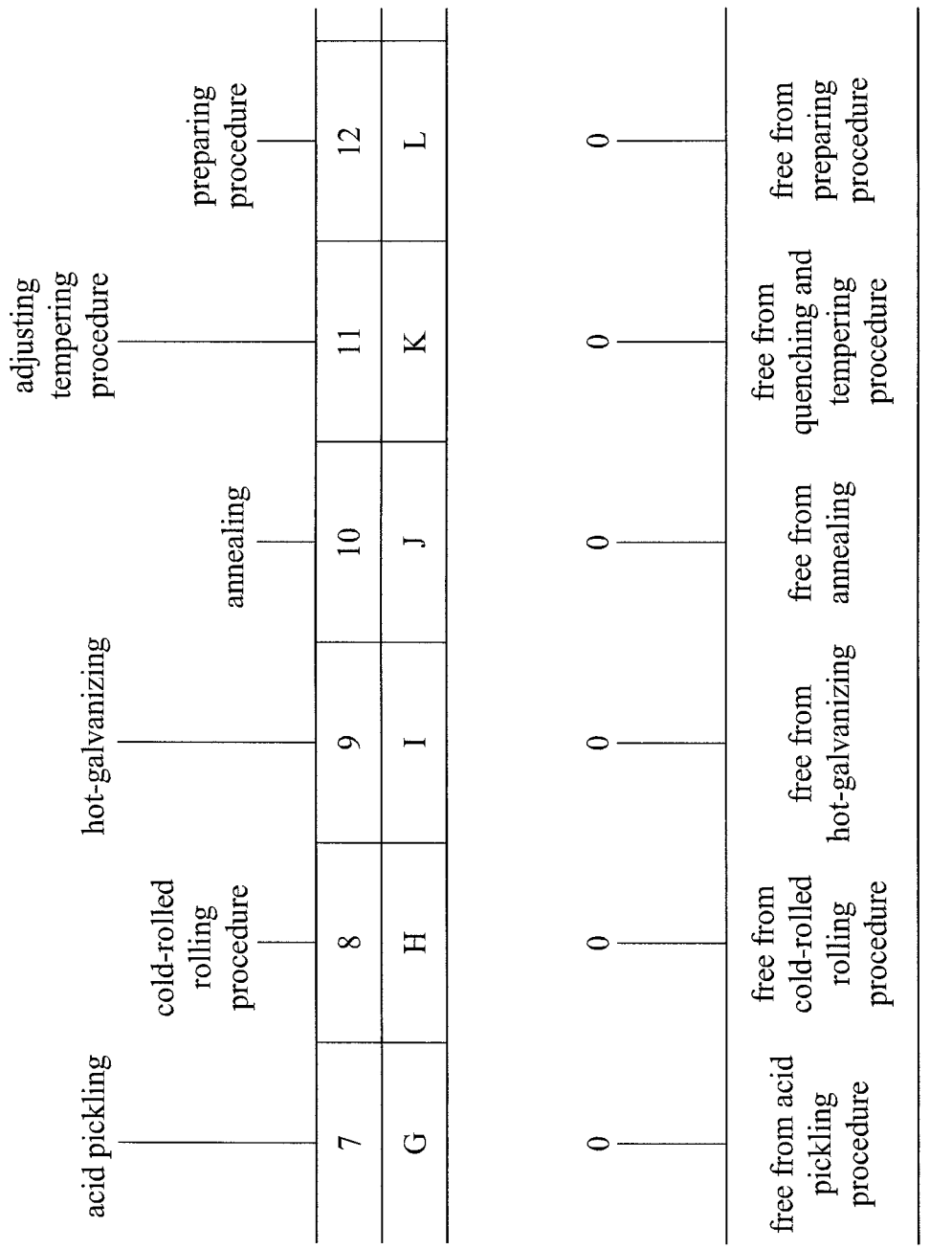
Figure 3:
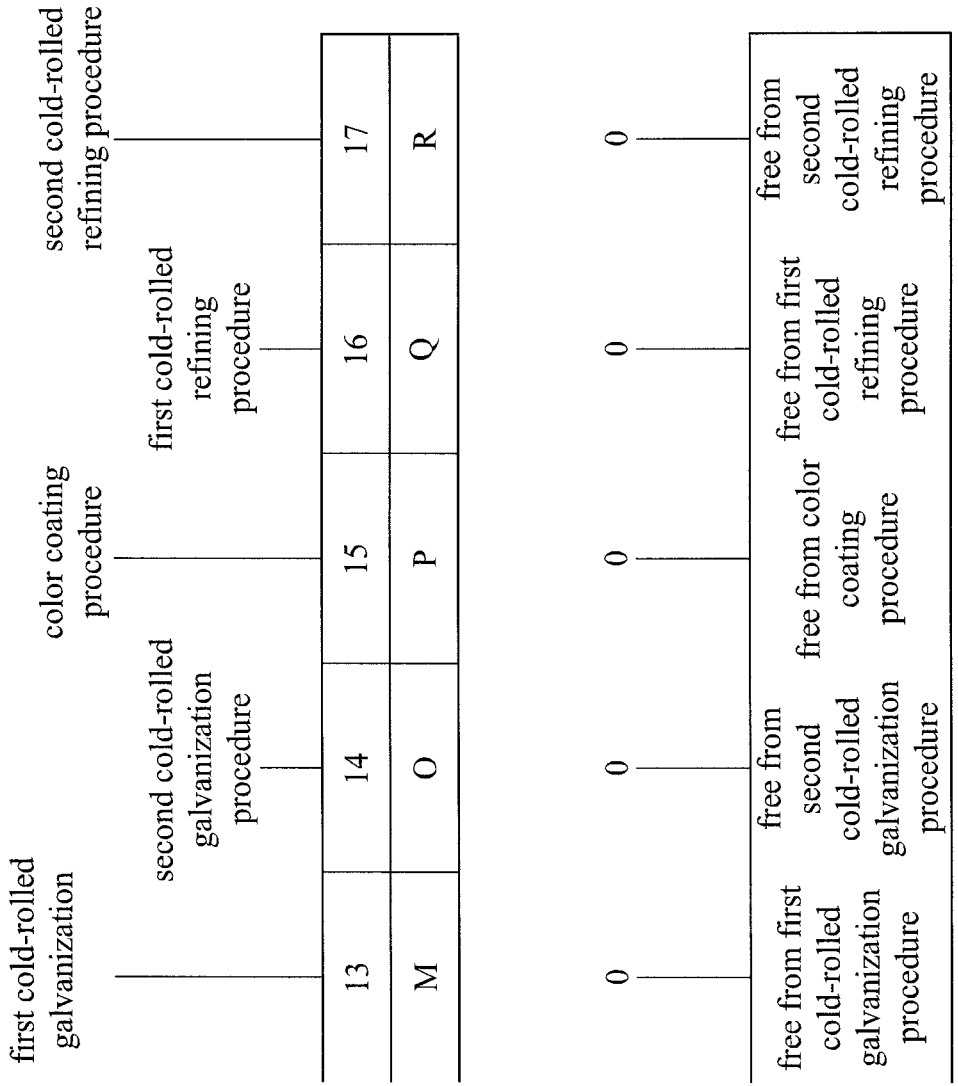
Figure 4:
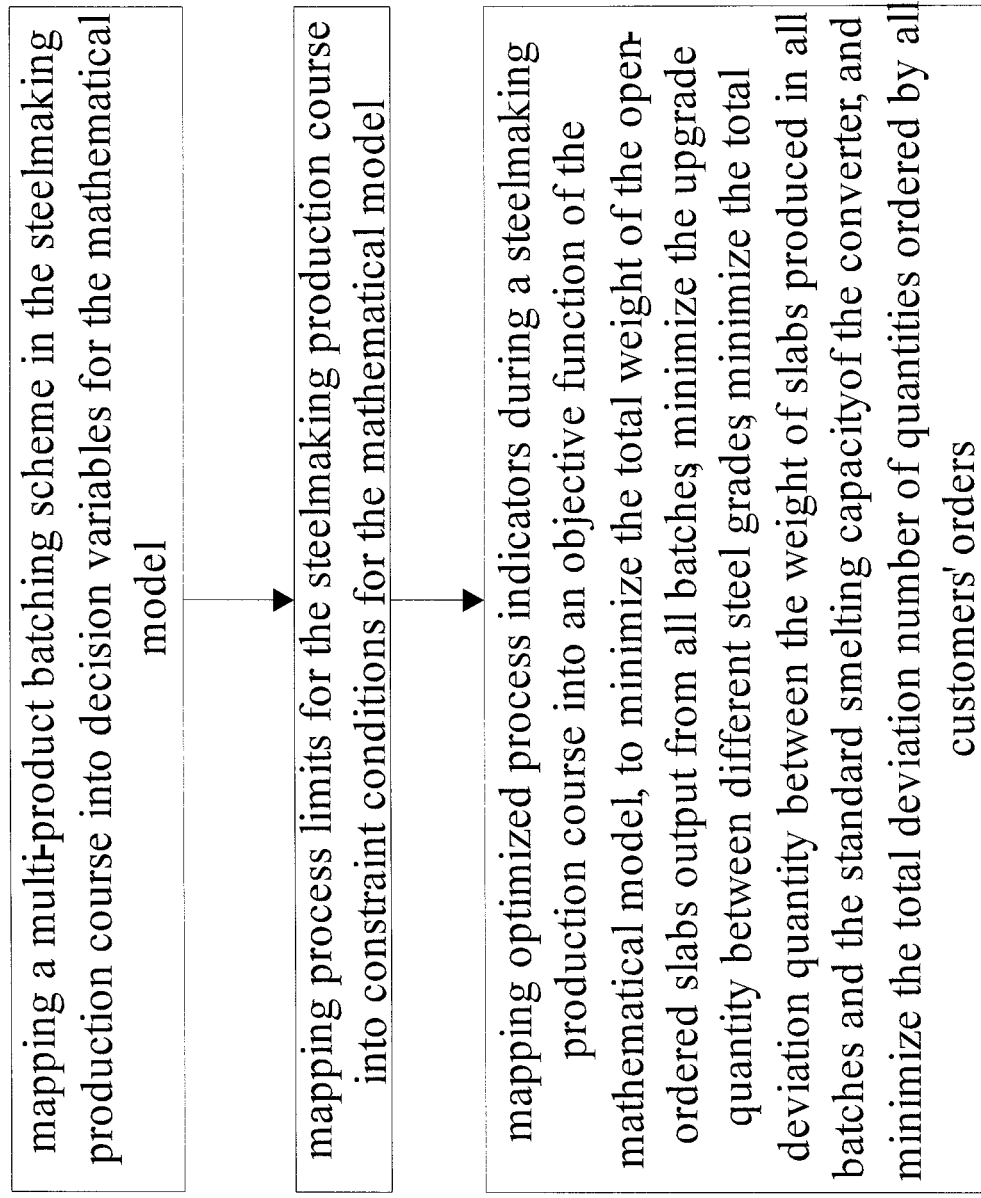
FIG. 4 is a flow chart of describing the batching production decision of multiple products in the steelmaking procedure by constructing a mathematical model according to an embodiment of the present invention.
Figure 5:
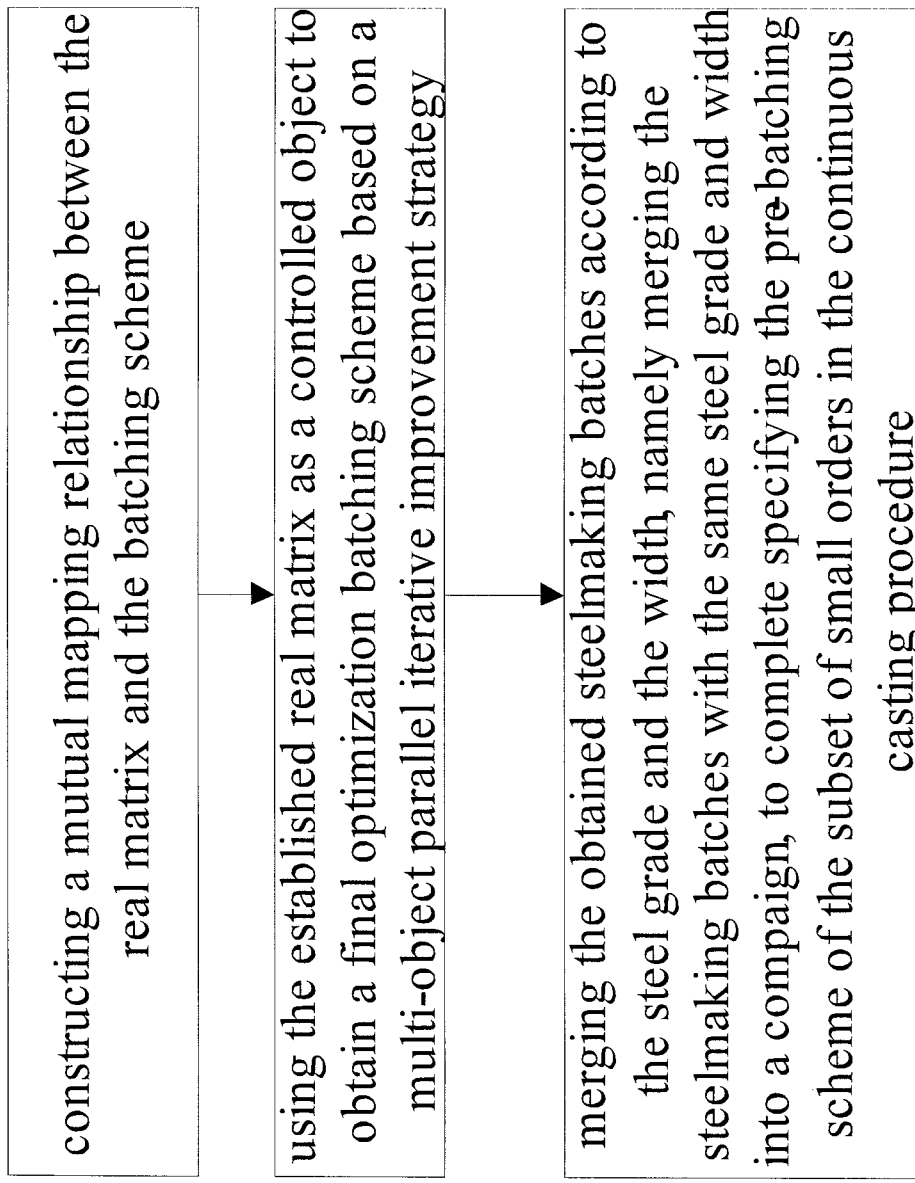
FIG. 5 is a flow chart of obtaining a pre-batching scheme method of the subset of small orders in the continuous casting procedure according to an embodiment of the present invention.

In this embodiment of the present invention, a method of batching and scheduling for steelmaking production with plant-wide process consideration, with the flow chart as shown in FIG. 1, including the following steps:

step 1, describing a production environment by constructing a directed topological network;

in this embodiment of the present invention, as shown in FIG. 2, wherein each node on the directed topological network represents a specific production unit or inventory equipment, including: a converter, a refining furnace, a continuous caster, a slab warehouse, a hot rolling mill, a temper mill, a hot-rolled coil warehouse, an acid pickling unit and an acid rolling mill; each arc on the directed topological network represents a specific material transfer course from one unit or inventory equipment to another unit or inventory equipment, including: molten steel, slabs, hot-rolled coils and cold-rolled coils;

step 2, according to quality requirements for finished products by different customers' orders, setting product process parameters, including: determining the mapping of a product manufacturing process in the directed topological network, calculating casting width ranges of different products in the continuous caster according to steel grades, determining the upgrade relationship between different steel grades, and determining the casting with steel grade change and cost of different types of steel in tundishes;

in this embodiment of the present invention, as described in step 2, the determination of the mapping of the manufacturing flow on the directed topological network is achieved by establishing a uniform type of encoding of manufacturing process for any product; the encoding structure is as shown in FIG. 3, containing a total of 17 bits, each bit corresponds to one procedure on the plant-wide process of iron and steel, a non-zero value of each bit indicates that the product can be produced on specific equipment of the corresponding procedure, a zero value of each bit indicates that the product does not need to be produced through that procedure;

whether the product can be produced on the specific equipment of the corresponding procedure is determined by the physical and chemical properties of the product and process parameters of the specific equipment. Process parameters of the continuous casting procedure include the thickness of the crystallizers, the maximum casting width and minimum casting width allowed to be adjusted by the crystallizer, the maximum width and minimum width allowed to be cast by the continuous caster, casting speed of the continuous caster and the service life of the tundishes; process parameters of the hot rolling procedure include the maximum rolling thickness, minimum rolling thickness, the maximum rolling width, the minimum rolling width, and the permissible rolling hardness group; for the cold rolling procedure, the equipment process parameters include the maximum number of miles allowed for rolling mill work rolls (and support rolls), variations in different specifications and properties (including forward width maximum jump, and reverse width maximum jump) allowed by the rolling mill, unit time production of materials with different specifications and properties (specifications and properties of the rolling mill generally include: width, thickness and roughness) allowed by the rolling mill;

in this embodiment of the present invention, as described in step 2, calculating casting width ranges of different products in the continuous caster according to steel grades, adopts the calculation formula as follows:

$$d_i^{max} = \left\lfloor \frac{\min(d_i^r + p_{g(i)}, D^{max})}{\sigma} \right\rfloor * \sigma \quad (28)$$

$$d_i^{min} = \left\lceil \frac{\max(d_i^r, D^{min})}{\sigma} \right\rceil * \sigma \quad (29)$$

wherein $d_i^r$ represents the width of finished products (hot-rolled coils or cold-rolled coils) ordered by customer order i, g(i) represents the steel grade of the finished products ordered by customer order i, $p_{g(i)}$ represents the maximum width spread pressure measurement quantity allowed for steel grade g (i) on the hot rolling procedure, $\sigma$ is the minimum on-line width adjustment amplitude allowed during operation of the continuous caster, $D^{max}$ represents the maximum process set width of the continuous caster, and ($D^{min}$) represents the minimum process set width of the continuous caster;

in this embodiment of the present invention, as described in step 2, determining the upgrade relationship between different steel grades is achieved by calculating differences in the contents of elements of carbon, phosphorus, sulfur, manganese and silicon in different steel grades, and by calculating the degree of intersection of any chemical elements contained in any steel grade g and any steel grade h from formula (30):

$$d_{egh} = \min\{\max(C_{eh} - \max(C_{eg}^{min}, C_{eh}^{min}), 0), \max(C_{eg}^{max} - \max(C_{eg}^{min}, C_{eh}^{min}), 0)\} \quad (30)$$

wherein $C_{eh}^{min}$ represents requirements for the lower limit of chemical element e (including carbon, phosphorus, sulfur, manganese and silicon) contained in steel grade h; $C_{eg}^{min}$ represents requirements for the lower limit of chemical element e (including carbon, phosphorus, sulfur, manganese and silicon) contained in steel grade g; $C_{eh}^{max}$ resents requirements for the upper limit of chemical element e (including carbon, phosphorus, sulfur, manganese and silicon) contained in steel grade h; $C_{eg}^{max}$ represents requirements for the upper limit of chemical element e (including carbon, phosphorus, sulfur, manganese and silicon) contained in steel grade g; $d_{egh}$ represents the overlap coefficient in chemical element e between steel grade h and steel grade g;

the alternative relationship between steel grade g and steel grade h is calculated by formula (31):

$$s_{gh} = \prod_e d_{egh} \quad (31)$$

if $s_{gh}=0$, then steel grade g and steel grade h cannot be replaced, or else steel grade g and steel grade h can be replaced;

in this embodiment of the present invention, as described in step 2, determining the casting with steel grade change and cost of different grades of steel in tundishes is achieved by calculating a coincidence value of the different steel grades corresponding to a casting code with steel grade change and an index code; particularly, determining the casting type with steel grade change by comparing the relationship between the casting code with steel grade change and the index code corresponding to any steel grade g and any steel grade h through formula (32):

$$q_{gh} = \Psi(m_g, m_h) + \Psi(n_g, n_h) \quad (32)$$

wherein $\Psi(a,b)$ is a customized comparison function, when a=b, $\Psi(a,b)=1$, else 0; $m_g$ and $n_g$ respectively represent the casting code with steel grade change and the index code corresponding to steel grade g;

if $q_{gh}=0$, steel grade g and steel grade h are not allowed to be cast with steel grade change, and casting cost with steel grade change for unit weight $f(g,h)=\infty$; if $q_{gh}=1$, steel grade g and steel grade h are allowed to be cast with steel grade change, and defined as casting type I with steel grade change; if $q_{gh}=2$, steel g and steel h are allowed to be cast with steel grade change, and defined as casting type II with steel grade change;

step 3, determining grouping to which product orders belong according to the steel grades, categories, optional manufacturing process and width ranges of the products required by the customers' orders, wherein if the sum of unfullfilled quantities for all orders required by customers is greater than or equal to the maximum number of allowed process continuous casting heats of the tundishes, such customers' orders belong to a subset of large orders, and performing step 6; or else the sum of unfullfilled quantities for all orders required by the customers is smaller than the maximum number of allowed process continuous casting heats of the tundishes, such customers' orders belong to a subset of small orders, and performing step 4 to step 5;

step 4, describing the batching production decision of multiple products in the steelmaking procedure by constructing a mathematical model, as shown in FIG. 4, the step includes the following steps of:

step 4-1, mapping a multi-product batching scheme in a steelmaking production course into decision variables for the mathematical model;

including the following steps of:

setting the continuous decision variable $x_{igwk}$ to represent the weight of production slabs with steel grade g and width w in the $k^{th}$ batch of order i; setting an integer decision variable $z_{igwk}$ to represent the number of the production slabs with steel grade g and width w in the $k^{th}$ batch of order i;

setting an integer decision variable $z_{0gwk}$ to represent the number of open-ordered slabs with steel grade g and width w in the $k^{th}$ batch; setting 0-1 decision variable $y_{gwk}$ which takes the value of 1 when the $k^{th}$ batch with steel grade g and width w is decided to be produced, or else, $y_{gwk}$ takes the value of 0;

step 4-2, mapping process limits for the steelmaking production course into constraint conditions for the mathematical model, including the following steps of:

step 4-2-1, establishing process constraints for substitution relationship of the product steel grades;

namely, for any steel grade g, determining a product set Ng produced with the steel grade;

$$N_g = \{i \in N | s_{g_i g} \neq 0\}, \forall g \in G \quad (1)$$

wherein N represents the total product set for a given subset of small orders, $g_i$ represents the steel grade of product i, $G = \cup_{i \in N} g_i$ represents the total steel grade set contained in the product set N, and $s_{g_i g}$ represents the substitute relationship between the steel grade g, of product i and any steel grade g;

step 4-2-2, establishing process constraints for the casting width ranges of the products on the continuous casting equipment;

namely, for any width w set for a crystallizer of the continuous caster, determining the slabs to be cast into the product set Pw with such width;

$$P_w = \{i \in N | d_i^{min} \leq w \leq d_i^{max}\}, \forall w \in W \quad (2)$$

wherein $w = \cup_{i \in N} d_i^{max}$ represents the total width set required for the crystallizer of the continuous caster during casting of the product set N; $d_i^{max}$ and $d_i^{min}$ respectively represent the maximum and minimum casting width allowed by product i;

in step 4-2-3, establishing process constraints for smelting capacity limit of each batch of the converter, which requires a total weight of the slabs required by the customers' orders and open-ordered slabs limited within the same batch of smelting is larger or less than a standard smelting capacity of the converter by a weight of one slab or less, wherein the open-ordered slabs are surplus materials produced to satisfy the full capacity of converter during smelting course but not assigned to any customers' orders;

with the specific formulas as follows:

$$\sum_{i \in N_g \cap P_w} x_{igwk} + z_{0gwk} P^{std} w h^{std} \rho + \delta_{gwk}^+ - \delta_{gwk}^- = C y_{gwk}, \quad (3)$$

$$\forall g \in G, w \in W, k \in \{1, 2, \ldots, K_{gw}\}$$

$$z_{igwk} \delta_{gwk}^+ \leq x_{igwk}, \quad (4)$$

$$\forall g \in G, w \in W, k = \{1, 2, \ldots, K_{gw}\}, i \in N_g \cap P_w$$

$$z_{igwk} \delta_{gwk}^- \leq x_{igwk}, \quad (5)$$

$$\forall g \in G, w \in W, k = \{1, 2, \ldots, K_{gw}\}, i \in N_g \cap P_w$$

wherein C represents the standard smelting capacity of the converter, $Q_i$ represents the unfulfilled quantity of product i, $$K_{gw} = \left\lceil \sum_{i \in N_g \cap P_w} Q_i / C \right\rceil$$

represents the upper limit of the batch number with steel grade g and width w, $\delta_{gwk}^+$ represents a part below the standard smelting capacity of the converter, of the batch, $\delta_{gwk}^-$ represents a part over the standard smelting capacity of the converter, of the batch, $l^{std}$ represents the standard length of the open-ordered slabs in the continuous casting production, $h^{std}$ represents the standard thickness of the open-ordered slabs in the continuous casting production, and p represents the density of the molten steel;

step 4-2-4, establishing process constraints for balancing on two strands so as to synchronize the consumptions of molten steel of two strands during casting of each furnace of molten steel on the continuous caster, requiring that casting times of two strands of the same furnace of molten steel on the continuous caster need to be equal to each other, which is mapped on the model as equal number of slabs cast from the two strands;

with the specific formula as follows:

$$\sum_{i\in N_g \cap P_w} z_{igwk} + z_{0gwk} = 2n_{gwk}, \quad (6)$$

$$\forall g \in G, w \in W, k = \{1, 2, \ldots, K_{gw}\}$$

wherein $n_{gwk}$ represents an auxiliary integer variable, indicating the number of slabs produced by the odd strand of the $k^{th}$ batch having steel grade g and width w;

step 4-2-5, establishing process constraints for cutting length ranges of the slabs on the continuous casting equipment, under limits by the cutting process of the continuous caster and length ordered by the customers, requiring that the lengths of any slabs cast from one furnace of molten steel need to be within a specified range;

with the specific formula as follows:

$$l_i^{min} \le x_{igwk}/z_{igwk} wh_i \rho \le l_i^{max}, \forall g \in G, w \in W, k = \{1, 2, \ldots, K_{gw}\}, i \in N_g \cap P_w, \quad (7)$$

wherein $h_i$ represents the slab thickness required for product i, while $l_i^{max}$ and $l_i^{min}$ represent the maximum and minimum slab length required by product i;

step 4-2-6, constructing flexible management constraints for customers' order quantities, requiring that the part below or beyond the customers' order quantities needs to be less than the weight of one slab;

$$\sum_{g,l,k} x_{iglk} + \theta_i^+ - \theta_i^- = Q_i \quad \forall i \in N \quad (8)$$

$$z_{igwk}\theta_i^+ \le x_{igwk} \quad (9)$$
$$\forall g \in G, w \in W, k \in \{1, 2, \ldots, K_{gw}\}, i \in N_g \cap P_w$$

$$z_{igwk}\theta_i^- \le x_{igwk} \quad (10)$$
$$\forall g \in G, w \in W, k \in \{1, 2, \ldots, K_{gw}\}, i \in N_g \cap P_w$$

wherein $\theta_i^+$ represents the insufficient part of the unfullfilled quantity, and $\theta_i^-$ represents the excessive part of the unfullfilled quantity;

step 4-3, mapping optimized process indicators during a steelmaking production course into an objective function of the mathematical model, to minimize the total weight of the open-ordered slabs output from all batches, minimize the upgrade quantity between different steel grades, minimize the total deviation quantity between the weight of slabs produced in all batches and the standard smelting capacity of the converter, and minimize the total deviation number of quantities ordered by all customers' orders;

in this embodiment of the present invention, mapping indicators of inventory cost of the open-ordered slabs into an objective function of formula (33), namely, minimizing the total weight of the open-ordered slabs output from all batches;

$$\sum_{g\in G}\sum_{w\in W}\sum_{k=1,\ldots,K_{gw}} l^{std} w h^{std} \rho z_{0gwk} \quad (33)$$

in this embodiment of the present invention, mapping indicators of cost lost due to steel upgrade between the steel grades into an objective function of formula (34), namely, minimizing the upgrade quantity between different steel grades;

$$\sum_{i\in N}\sum_{g\in G}\sum_{w\in W}\sum_{k=1,\ldots,K_{gw}} s_{g_i g} x_{igwk} \quad (34)$$

in this embodiment of the present invention, mapping indicators of operation efficiency of converter batch production into an objective function of formula (35), namely, minimizing the total deviation quantity between the weight of slabs produced in all batches and the standard smelting capacity of the converter;

$$\sum_{g\in G}\sum_{w\in W}\sum_{k=1,\ldots,K_{gw}} (\delta_{gwk}^+ + \delta_{gwk}^-) \quad (35)$$

in this embodiment of the present invention, mapping management indicators of customers' satisfaction degree about the ordered weight into an objective function of formula (36), namely, minimizing the total deviation quantity of all customers' orders;

$$\sum_{i\in N} (\theta_i^+ + \theta_i^-) \quad (36)$$

in summary, the objective function is specifically shown as follows:

$$F_0 = \lambda_1 \sum_{g\in G}\sum_{w\in W}\sum_{k=1,\ldots,K_{gw}} l^{std} w h^{std} \rho z_{0gwk} + \quad (11)$$

$$\lambda_2 \sum_{i\in N}\sum_{g\in G}\sum_{w\in W}\sum_{k=1,\ldots,K_{gw}} s_{g_i g} x_{igwk} +$$

$$\lambda_3 \sum_{g\in G}\sum_{w\in W}\sum_{k=1,\ldots,K_{gw}} (\delta_{gwk}^+ + \delta_{gwk}^-) + \lambda_4 \sum_{i\in N} (\theta_i^+ + \theta_i^-)$$

wherein $F_0$ represents the total cost for production batching of the subset of small orders, which is the linear aggregation of: the total quantity of open-ordered slabs of all batches, the upgrade quantity between different steel grades, deviation ordered quantity of all the customers' orders, and deviation quantity of the standard smelting capacity of the converter, $\lambda_1, \lambda_2, \lambda_3, \lambda_4 \in [0, 1]$ representing the weight coefficients of different objectives, and $\lambda_1+\lambda_2+\lambda_3+\lambda_4=1$.

step 5, constructing a mutual mapping relationship between a real matrix and the batching scheme, and using an established real matrix as a controlled object to obtain a final optimization batching scheme based on a multi-object parallel iterative improvement strategy, and then to obtain a pre-batching scheme of the subset of small orders in the continuous casting procedure, wherein the method procedure shown as FIG. 5 includes the following steps of:

step 5-1, constructing a mutual mapping relationship between the real matrix and the batching scheme, including the following steps of:

step 5-1-1, constructing a real matrix, wherein the dimension of the real matrix is a product of a total product number, the steel grade and the width of all products, and an element in the matrix is a ratio of the weight of the slabs assigned to a certain steel grade and a certain width by a certain order to the order unfulfilled quantity;

in this embodiment of the present invention, $|N|\times(|G|\times|W|)$-dimension real matrix A as expressed by formula (12) is designed:

$$A = \begin{pmatrix} a_{111} & a_{112} & \cdots & a_{11,|W|} & a_{121} & a_{122} & \cdots & a_{12,|W|} & \cdots & a_{1,|G|,1} & a_{1,|G|,2} & \cdots & a_{1,|G|,|W|} \\ a_{211} & a_{212} & \cdots & a_{21,|W|} & a_{221} & a_{222} & \cdots & a_{22,|W|} & \cdots & a_{2,|G|,1} & a_{2,|G|,2} & \cdots & a_{2,|G|,|W|} \\ \vdots & \vdots & \vdots & \vdots & \vdots & \vdots & \vdots & \vdots & \vdots & \vdots & \vdots & \vdots & \vdots \\ a_{|N|,11} & a_{|N|,12} & \cdots & a_{|N|,1,|W|} & a_{|N|,11} & a_{|N|,22} & \cdots & a_{|N|,2,|W|} & \cdots & a_{|N|,|G|,1} & a_{|N|,|G|,2} & \cdots & a_{|N|,|G|,|W|} \end{pmatrix} \quad (12)$$

wherein A represents a $|N|\times(|G|\times|W|)$-dimension real matrix, N represents a total product set of a given subset of small orders, w represents a set of all possible widths required to be set for the crystallizer of the continuous caster during casting of product set N, and $a_{|N|,|G|,|W|}$ represents the ratio of the weight of the slabs in all batches corresponding to the order N with steel grade G and width W to the unfulfilled quantity of the order N;

step 5-1-2, obtaining the weight of the slabs with the objective steel grade and an objective width, in all batches, set in a certain order, and the weight of the slabs with the objective steel grade and the objective width, in all batches, sequencing (from large to small) all combinations of the steel grades and widths according to the weight values of all ordered slabs in all batches, and performing steps 5-1-3 to 5-1-9 in the sequence so as to obtain a batching scheme of orders for all combinations of steel grades and widths:

for a given matrix A, calculating the weight $b_{igw}$ of the slabs with steel grade g and width w, in all batches, set by the order i according to formula (13), and calculating the weight $B_{gw}$ of all the ordered slabs with steel grade g and width w, in all batches, according to formula (14):

$$b_{igw} = \frac{a_{igw}Q_i}{\sum_{g\in G}\sum_{w\in W} a_{igw}} \quad (13)$$

$$B_{gw} = \sum_{i\in N} b_{igw} \quad (14)$$

wherein $b_{igw}$ represents the weight of the slabs with the objective steel grade g and the objective width w, in all batches, set in the order i, $B_{gw}$ represents the weight of all the ordered slabs with steel grade g and width w, in all batches, $a_{igw}$ represents the ratio of the weight of the slabs with steel grade g and width w, in all batches, set in the order i, to unfulfilled quantity of order i, and $Q_i$ represents the unfulfilled quantity of product;

step 5-1-3, for any combination of steel grade and width (g, w), counting the weight of slabs assigned to batches with such combination of steel grade and width set in all the orders, denoting as $(b_{1gw}\ b_{2gw}\ \ldots\ b_{|N|gw})^T$, constructing an empty batch k not containing any order, and setting the weight $E_k$ of slabs contained in the empty batch to be 0;

step 5-1-4, selecting an order i with first $b_{igw}>0$ from the slab weight vectors $(b_{1gw}\ b_{2gw}\ \ldots\ b_{|N|gw})^T$, and comparing the remaining capacity $C-E_k$ of the empty batch k with the size of the first slab weight $b_{igw}$; if the remaining capacity $C-E_k$ is greater than or equal to the first slab weight $b_{igw}$, performing step 5-1-5, or else performing step 5-1-6;

step 5-1-5, replacing the unfulfilled quantity $Q_i$ of a corresponding product in the flexible management constraint conditions for the customers' order quantities with the slab weight $b_{igw}$ of the product, obtaining $z_{igwk}$ of slabs according to the process conditions set forth in steps 4-2-5 to 4-2-6, putting the slabs in the empty batch k, updating the slab weight $E_k$ of the batch and setting $b_{igw}=0$; then, performing step 5-1-7;

step 5-1-6, replacing the unfulfilled quantity $Q_i$ of a corresponding product in the flexible management constraint conditions for the customers' order quantities with the remaining capacity $C-E_k$, obtaining $z_{igwk}$ of slabs according to the process conditions set forth in steps 4-2-5 to 4-2-6, putting the slabs in the empty batch k, updating $E_k$ and setting $b_{igw}=0$;

step 5-1-7, in the absence of the addition of open-ordered slabs, judging whether the slabs contained in the empty batch k meet the process constraints limited by the smelting capacity of the converter for each batch; if yes, performing step 5-1-8, or else, performing step 5-1-9;

step 5-1-8, judging whether the slabs contained in the empty batch k meet the process constraints for balancing on two strands so as to synchronize the consumptions of molten steel of two strands; if yes, directly creating the next empty batch not containing any order and setting the weight of the slabs contained in this batch to be 0, or else remedying the batch by adding or removing one slab to/from the empty batch k so as to meet the constraints for balancing on two strands, then creating the next empty batch not containing any order and setting the weight $E_k$ of the slabs contained in this batch to be 0; then, performing step 5-1-10;

step 5-1-9, judging whether the slab weight vector $(b_{1gw}\ b_{2gw}\ b_{|N|gw})^T$ is equal to 0, if yes, adding open-ordered slabs in the last non-empty batch according to the process constraint conditions limited by the smelting capacity of the converter for each batch and process constraint conditions for balancing on two strands so as to synchronize the consumptions of molten steel of two strands, then proceeding to step 5-1-10, or else, returning to perform step 5-1-4;

step 5-1-10, if performing steps 5-1-3 to 5-1-9 for the weight of all ordered slabs in all batches and obtaining a batching scheme of orders for all combinations of steel grades and widths have been finished, then proceeding to step 5-2, or else continuing to perform steps 5-1-3 to 5-1-9;

step 5-2, using the established real matrix as a controlled object to obtain a final optimization batching scheme based on a multi-object parallel iterative improvement strategy, including the steps of:

step 5-2-1, randomly generating real matrices in the number of NP with the same structure as the real matrix described in step 5-1-1, putting all the constructed real matrices in a set $\{A^1, A^2, \ldots, A^{NP}\}$, setting $a_{igw}$ to be 1 for triple (i, g, w) meeting condition $i \in N_g \cap P_w$ in each real matrix $A^j$ (j=1, 2, ..., NP), and setting the non-meeting element to be 0;

wherein $a_{igw}$ is a random number generated from an evenly distributed real interval [L, U], L and U being the lower bound and the upper bound of the interval respectively; NP is pre-set population size based on a multi-object parallel iterative improvement strategy algorithm;

step 5-2-2, returning all the generated real matrices $A^j$ (j=1, 2, ..., NP) to perform steps 5-1-1 to 5-1-10, establishing a corresponding relationship between each real matrix $A^j$ and the batching scheme, obtaining values of decision variables (x, z, y) according to the batching scheme, and substituting the variables into the objective function (namely, formula (11)) so as to obtain an objective function $f(A^j)$ corresponding to each real matrix;

step 5-2-3, sequencing the obtained objective functions $f(A^j)$ from small to large, dividing the real matrices in the first half of the ranking into one group denoted as S, and dividing those in the second half of the ranking into the other group denoted as I; S and I shall meet: $\max\{f(A^j) | A^j \in S\} \leq \min\{f(A^j) | A^j \in I\}$;

step 5-2-4, performing mutation operation and cross operation on each real matrix $A^j$ (j=1, 2, ..., NP) according to the grouping to which the objective function corresponding to each real matrix belongs to, to obtain the real matrices after cross operation, then returning all the real matrices after cross operation to perform steps 5-1-1 to 5-1-10, establishing a corresponding relationship between each real matrix after operation and the batching scheme, obtaining values of decision variables according to the batching scheme, and substituting the variables into the objective function to obtain an objective function corresponding to each real matrix after operation; including the steps of:

step 5-2-4-1, selecting three real matrices $A^{r1}, A^{r2}$ and $A^{r3}$ which are different from the objective real matrix $A^j$ and are different from each other from the set $\{A^1, A^2, \ldots, A^{NP}\}$ consisting of the real matrices, namely, $j \neq r1 \neq r2 \neq r3$;

step 5-2-4-2, randomly generating a mutation step length factor $F_j$ from an evenly distributed real interval [j/NP, 1];

step 5-2-4-3, performing differential operation on the real matrices $A^j, A^{r1}, A^{r2}$ and $A^{r3}$, to obtain a real matrix $V^j$ after the mutation operation;

$$V^j = A^j + \begin{cases} F_0(A^{r1} - A^j) + F_0(A^{r2} - A^{r3}), & A^j \in S' \\ F_0(A^{r*} - A^j) + F_0(A^{r2} - A^{r3}), & A^j \in I \end{cases} \quad (15)$$

wherein $A^{r*}$ is the real matrix currently with the smallest current objective function value, and $f(A^{r*}) = \min\{f(A^j) | j=1, 2, \ldots, NP\}$ is met; S' represents the grouping of the real matrices in the first half of the ranking when sequencing the obtained objective functions from small to large, and I represents the grouping of those in the second half of the ranking;

step 5-2-4-4, randomly generating a cross probability factor $CR_{igw}$ for each element of the matrix from the evenly distributed real interval [j/NP, 1];

step 5-2-4-5, performing cross operation on each pair of real matrices and $V^j$ to generate a real matrix $U^j$;

$$u_{igw}^j = \begin{cases} v_{igw}^j, & \text{if}(rand_{igw}^j(0, 1) < CR_{igw}), \\ a_{igN}^j, & \text{else} \end{cases} \quad (16)$$

wherein $u_{igw}^j$ represents an element in the real matrix $U^j$, $v_{igw}^j$ represents an element in the real matrix $V^j$, $a_{igw}^j$ represents an element in the real matrix $A^j$, j=1, 2, ..., NP, $i \in N$, $w \in W$, $k \in \{1, 2, \ldots, K_{gw}\}$; W represents a set of all possible widths required for the crystallizer of the continuous caster during casting of product set N; $K_{gw}$ represents the upper limit of the number of batches with steel grade g and width w; and $rand_{igw}^j(0, 1)$ represents random numbers obeying normal distribution between (0, 1); and step 5-2-4-6, judging whether element $u_{igw}^j < L$ or $u_{igw}^j > U$, if yes, treating boundary conditions for the real matrix $U^j$, or else, completing the cross operation, with the specific formula as follows:

$$u_{igw}^j = L + \text{rand}_{igw}^j(0,1)(U-L) \quad (17)$$

wherein L represents the lower limit of the value range of element $u_{igw}^j$, and U represents the upper limit of the value range of element $u_{igw}^j$.

Figure 6:
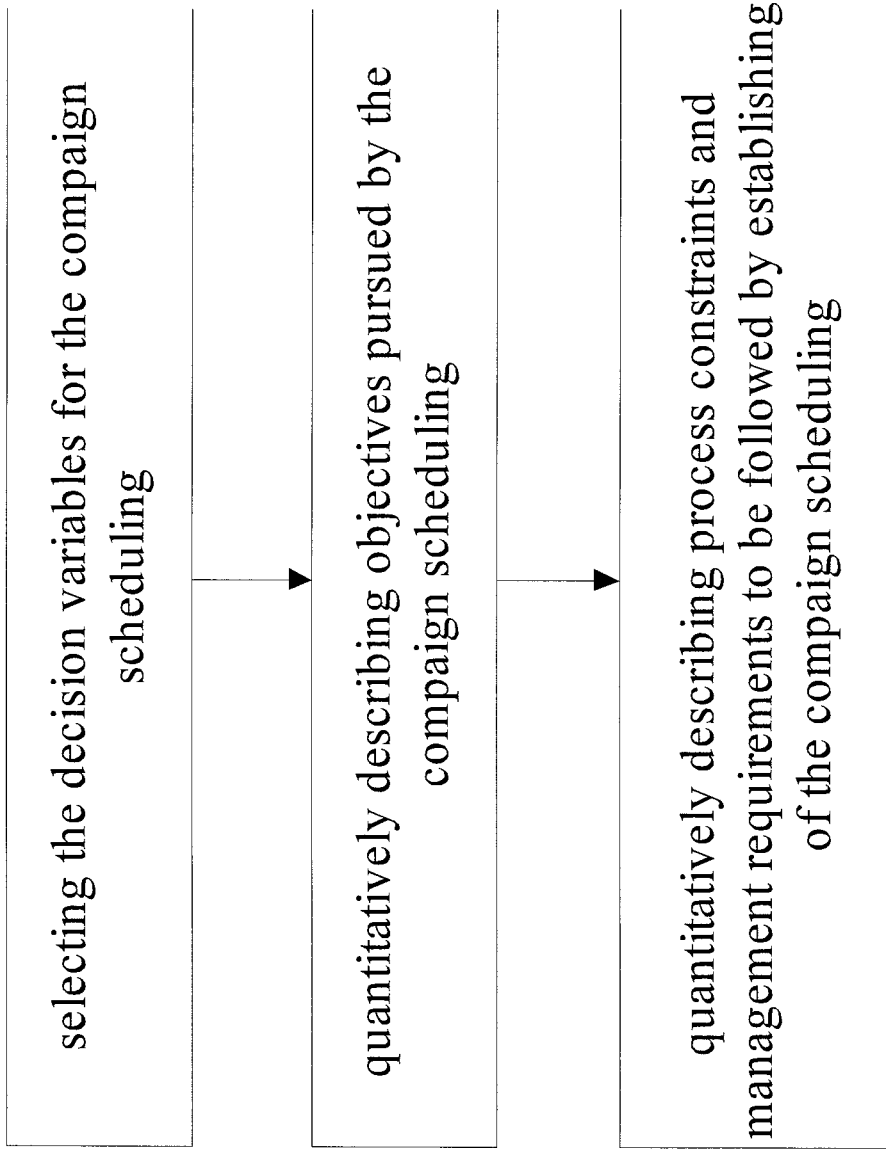
FIG. 6 is a flow chart of a method for determining the scheduling decision of a campaign scheduling on the continuous casting equipment according to an embodiment of the present invention.

Step 5-2-5 performing the steps (5.1.1-5.1.6) for each real matrix $U_j$ (j=1, 2, ..., NP), establishing a corresponding relationship between $U^j$ and the batching scheme, and substituting values of decision variables (x, z, y) corresponding to the batching scheme into formula (19), to obtain a weighting objective function denoted as $f(U^j)$ under the batching scheme; comparing $f(U^j)$ with $f(A^j)$, updating the matrix according to formula (26), and repeating steps 5-2-2 to 5-2-4 for the updated matrix set $\{A^1, A^2, \ldots, A^{NP}\}$ until the set $\{A^1, A^2, \ldots, A^{NP}\}$ is not updated any more;

step 5-2-6, selecting the real matrix $A^{j*}$ with the smallest objective function value $f(A^j)$ from the final matrix set $\{A^1, A^2, \ldots, A^{NP}\}$ and returning such matrix to perform steps 5-1-1 to 5-1-10 so as to obtain the final optimization batching scheme;

step 5-3, merging the obtained steelmaking batches according to the steel grade and the width, merging the steelmaking batches with the same steel grade and width into a campaign, to complete specifying the pre-batching scheme of the subset of small orders in the continuous casting procedure; then performing step 7;

step 6, developing a batching scheme in the steelmaking procedure and a pre-batching scheme in the continuous casting procedure of the subset of large orders;

in this embodiment of the present invention, calculating the unfulfilled quantity $Q = \Sigma_{i \in N} Q_i$ of all products in a given subset of large orders for products required iEN by such grouping; calculating the number $K = \lfloor Q/C \rfloor$ of steelmaking batches to be produced by the subset of large orders according to production process requirements for converter smelting full-batch; dividing K steelmaking batches into $\lfloor K/T^{max} \rfloor$ campaigns on the continuous casting procedures according to the maximum number $T^{max}$ of continuous casting heats by tundishes, wherein the first $\lfloor K/T^{max} \rfloor - 1$ campaigns contain $T^{max}$ heats, and $\lfloor K/T^{max} \rfloor$ campaigns contain $K - T^{max} \times (\lfloor K/T^{max} \rfloor - 1)$ heats;

in this embodiment of the present invention, calculating the unit capacity and counting the inventory structure by the following specific steps of: obtaining information about production capacity of steelmaking, refining, continuous casting and hot rolling equipment every day during a planned period by calculating the difference between the standard production capacity of the steelmaking, refining, continuous casting and hot rolling equipment and the downtime caused by an equipment maintenance plan; for products required by all given customers' orders, according to different dimensions of the orders, carrying out statistical analysis on multiple properties of the orders, including obtaining order unfullfilled quantity distribution information of different flow directions, order unfullfilled quantity distribution information of different manufacturing procedures, order unfullfilled quantity distribution information of the different categories and unfullfilled quantity proportion information of different refining methods, determining delivery date information of key orders and delivery date information of slab orders, and obtaining set batch demand information of special grades in hot rolling procedures (warm roll, hard roll, IF steel, and box plate) and demand information of different material groups in cold rolling procedure; conducting statistics about inventory information of work-in-process products on inventory equipment in the plant-wide process network; determining the range of number of daily-required heats for RH refining within the planned period of time, the range of daily-required weight of warm rolls and hard rolls in hot rolling procedure, and the range of daily-required weight of each material group in cold rolling procedure according to statistical results of unit capacity and inventory structure;

step 7, determining a scheduling decision of a campaign on the continuous casting equipment by constructing a quantitative mathematical model, including: selecting decision variables for the campaign scheduling; quantitatively describing objectives pursued by the campaign scheduling; and quantitatively describing process constraints and management requirements to be followed by the campaign scheduling, wherein the method procedure as shown in FIG. 6, includes the following steps of:

step 7-1, selecting the decision variables for the campaign scheduling, including the following steps of:

setting 0-1 decision variable $u_{rls}$ to represent whether campaign r is assigned at the first position of the continuous casting equipment s; setting auxiliary variable $Q_{ls}$ to represent the casting completion time of a campaign at the first position of the continuous casting equipment s; setting auxiliary variable $T_r$ to represent the casting completion time of the campaign r; setting auxiliary variable $t_i$ to represent the casting completion time of order i; setting auxiliary variable $I_{hd}^{warm}$ to represent a planned inventory for warm rolls in a front warehouse of a hot rolling plant h on the $d^{th}$ day; setting auxiliary variable $I_{hd}^{hard}$ to represent a planned inventory for the hard rolls in front warehouse of a hot rolling plant h on the $d^{th}$ day; and setting auxiliary variable $\Delta_{fd}$ to represent the quantity of slabs planned to be produced by a steelmaking plant on the $d^{th}$ day for flow direction f;

step 7-2, quantitatively describing objectives pursued by the campaign scheduling, including: maximizing the utilization of tundishes, minimizing the number of continuously cast slabs in different steel grades, minimizing the number of slabs with adjusted width, minimizing inventory deviations of warm rolls, minimizing inventory deviations of hard rolls, minimizing deviations in demand for hot rolling and cold rolling in all flow directions, and minimizing delay time of the customers' orders;

maximizing the utilization of tundishes, namely, requiring that the number of tundishes used after the casting of all campaigns needs to be the minimum, with the specific formula as follows:

$$F_1 = \sum_{s \in S} \left( \left\lceil \frac{\sum_{l=1}^{l_1-1} \sum_{r \in R} a_r u_{rls}}{Tun^{max}} \right\rceil \right) + \sum_{\tau \in \{1,2,\ldots,b_s-1\}} \left( \left\lceil \frac{\sum_{l=l_\tau}^{l_{\tau+1}-1} \sum_{r \in R} a_r u_{rls}}{Tun^{max}} \right\rceil \right) + \left\lceil \frac{\sum_{l=l_{b_s}}^{|R|} \sum_{r \in R} a_r u_{rls}}{Tun^{max}} \right\rceil \quad (18)$$

wherein $F_1$ represents the total cost of the tundishes updated for all campaign scheduling; S represents a set of continuous casting equipment; R represents a set of all campaigns; $a_r$ represents the number of heats contained in campaign r; $Tun^{max}$ represents the maximum number of heats which can be cast in one tundish; $b_s$ represents the number of batches which cannot be cast continuously on the continuous casting equipment s; $l_\tau$, $\forall \tau \in \{1, 2, \ldots, b_s\}$ represents the position of the $\tau^{th}$ batch which cannot be cast with steel grade change, that is campaigns $$\sum_{r \in R} u_{r(l_\tau-1)s} r \text{ and } \sum_{r \in R} u_{rl_\tau s} r$$

cannot be cast with steel grade change, or the difference in widths of campaigns $$\sum_{r \in R} u_{r(l_\tau-1)s} r \text{ and } \sum_{r \in R} u_{rl_\tau s} r$$

exceeds the maximum allowed on-line width adjustment amplitude of the continuous caster;

minimizing the number of continuously cast slabs in different steel grades with the specific formula:

$$F_2 = \sum_{s \in S} \left( \sum_{l=1}^{l_1-2} f\left(g \sum_{r \in R} r u_{rls}, g \sum_{r \in R} r u_{r,l+1,s}\right) + \sum_{\tau \in \{1,2,\ldots,b_s-1\}} \sum_{l=l_\tau}^{l_{\tau+1}-2} f\left(g \sum_{r \in R} r u_{rls}, g \sum_{r \in R} r u_{r,l+1s}\right) + \sum_{l=l_{b_s}}^{|R|-1} f\left(g \sum_{r \in R} r u_{rls}, g \sum_{r \in R} r u_{r,l+1s}\right) \right) \quad (19)$$

wherein $F_2$ represents the total cost for continuous casting of all different steel grades in campaign scheduling;

$$\sum_{r \in R} r u_{rls}$$

represents the campaigns assigned at the first position of the continuous casting equipment s, and $$g \sum_{r \in R} ru_{rls}$$

represents the steel grade of campaign $$\sum_{r \in R} ru_{rls};$$

minimizing the number of slabs with adjusted width with the specific formula:

$$F_3 = \sum_{s \in S} \left( \sum_{l=1}^{l_1-2} h\left(w \sum_{r \in R} ru_{rls}, w \sum_{r \in R} ru_{r,l+1,s}\right) + \sum_{\tau \in \{1,2,\ldots,b_s-1\}} \sum_{l=l_\tau}^{l_{\tau+1}-2} h\left(w \sum_{r \in R} ru_{rls}, w \sum_{r \in R} ru_{rl+1s}\right) + \sum_{l=l_{b_s}}^{|R|-1} h\left(w \sum_{r \in R} ru_{rls}, w \sum_{r \in R} ru_{rl+1s}\right) \right) \quad (20)$$

wherein $F_3$ represents the total cost of all width adjustment for campaign scheduling;

$$w \sum_{r \in R} ru_{rls}$$

represents the width of campaign $$\sum_{r \in R} ru_{rls};$$

if the two parameters are the same, the function h(.) is 0, or else, the function h(.) is 1;

minimizing inventory deviations of warm rolls, namely, requiring that the deviation between planned inventory for the warm rolls in a hot-rolling front warehouse and the objective inventory needs to be the minimum to ensure the smooth production of hot rolling, with the specific formula as follows:

$$F_4 = \sum_{h \in H} \sum_{d \in D} |I_{hd}^{warm} - \bar{I}_{hd}^{warm}| \quad (21)$$

wherein $F_4$ represents the risk cost of all warm roll inventories; H represents a set of hot rolling mills, D represents a set of days in a planned period, and $I_{hd}^{warm}$ represents the objective inventory of the warm rolls required for the hot rolling plant h on the $d^{th}$ day;

minimizing inventory deviations of hard rolls, namely, requiring that the deviations between the planned inventory for the hard rolls in the hot-rolling front warehouse and the allowed maximum and minimum inventories of the hard rolls need to be the minimum, so as to reduce material flow blockage due to excessive hard rolls, with the specific formula as follows:

$$F_5 = \sum_{h \in H} \sum_{d \in D} \max(I_{hd}^{hard} - \bar{I}_{hd}^{hard}, 0) + \max(\underline{I}_{hd}^{hard} - I_{hd}^{hard}, 0) \quad (22)$$

wherein $F_5$ represents the risk cost of all difficult roll inventories; $\bar{I}_{hd}^{hard}$ represents the maximum hard roll inventory in the hot rolling plant h on the $d^{th}$ day; $\underline{I}_{hd}^{hard}$ represents the allowed minimum hard roll inventory in the hot rolling plant h on the $d^{th}$ day;

minimizing delay time of the customers' orders, with the specific formula as follows:

$$F_6 = \sum_{i \in N^R} \max(t_i - Due_i, 0) + \max(Ear_i - t_i, 0) \quad (23)$$

wherein $F_6$ represents satisfaction degree gains of the customers' orders; $N^R$ represents a set of orders with strict delivery date requirements, $Ear_i$ represents the earliest delivery date of order i, and $Due_i$ represents the latest delivery date of order i;

in step 7-3, quantitatively describing process constraints and management requirements to be followed by the campaign scheduling, including the following steps of:

creating assignment relation constraints of campaigns on the continuous casting equipment, namely, requiring that each campaign can only be assigned to one position on the continuous casting equipment, and each position on each piece of continuous casting equipment can only be assigned with one campaign, non-assigned positions on each continuous casting equipment are behind positions assigned with the campaigns, with the specific formulas as follows:

$$\sum_{s \in S} \sum_{l=1}^{|R|} u_{rls} = 1, \forall r \in R \quad (24)$$

$$\sum_{r \in R} u_{rls} \leq 1, s \in S, l \in \{1, 2, \ldots, |R|\} \quad (25)$$

$$\sum_{r \in R} u_{r,l+1,s} \leq \sum_{r \in R} u_{rls}, s \in S, l \in \{1, 2, \ldots, |R|-1\} \quad (26)$$

creating feasible assignment rule constraints, namely, allowing a campaign to be assigned onto the continuous casting equipment only when order manufacturing procedures contained in the campaign are compatible with the given continuous casting equipment, with the specific formula as follows;

$$u_{rls} < v_{rs} \quad (27)$$

in the formula, $v_{rs}$ represents a compatibility parameter between the order manufacturing procedures contained in the campaign r and continuous casting equipment s, $v_{rs} \in \{0, 1\}$.

including: assignment relation constraints and feasible assignment rule constraints of the campaigns on the continuous casting equipment;

step 8, taking the mathematical model established in step 7 as a basis for quantitative calculation, and obtaining a scheduling scheme of the campaign on the continuous casting equipment based on the multi-object parallel iterative improvement strategy by establishing a mutual mapping relationship between the real vectors and the scheduling scheme of the campaign on the continuous casting equipment, and using the established real vectors as the controlled object, obtaining the assignment and sequence of the campaigns for the continuous casting equipment, including the following steps of:

step 8-1, setting a 2 |R|-dimension real vector PP=[$a_1, a_2, \ldots a_{|R|}|b_1, b_2 \ldots b_{|R|}$], and determining the value of each component of the real vector PP, wherein $a_r$ and $b_r$ are dimensionless real parameters in the range of [0, 1]; $1 \leq r \leq |R|$, wherein R represents a set of all campaigns;

step 8-2, determining set Rs of campaigns assigned to any continuous casting equipment s according to the $b_r$ value;

$$\text{namely, } R_s = \left\{ v_{rs} = 1, \, \frac{\sum_{s'=1}^{s} v_{rs'} - 1}{\sum_{s'=1}^{|S|} v_{rs'}} < b_r \leq \frac{\sum_{s'=1}^{s} v_{rs'}}{\sum_{s'=1}^{|S|} v_{rs'}} \, \middle| \, r \in R \right\};$$

step 8-3, determining the sequence of all campaigns assigned to any continuous casting equipment s according to the $a_r$ value;

in this embodiment of the present invention, for any continuous casting equipment s, determining the sequencing of all the campaigns assigned to the equipment by the $a_r$ value; namely, ranking the campaign arg min$\{a_r | r \in R_s\}$ having the smallest $a_r$ value in set $R_s$ at the first position on the continuous casting equipment s, ranking the campaign arg min$\{a_r | r \in R_s\}$ having the second smallest $a_r$ value in set $R_s$ at the second position on the continuous casting equipment s, and so on; and step 9, adjusting, issuing and executing an integration scheme of batching and scheduling.

The batching and scheduling scheme with one-week production order data as described in the embodiment, obtained by the method of integrating the batching plan and the production scheduling scheme as described in the present invention, are shown as the following table:

obtain the final production organization scheme which is further finely adjusted according to plan specificity at the beginning and the end of a month, the actual supply of molten iron, the delivery date information of key orders, reservation of orders whose steel grades need clean cold steel not passing through an RH refining machine and material flow linkage in the whole process, in combination with actual field production fluctuations, and issued to all production and manufacturing units at the steelmaking stage; these production and manufacturing units prepare materials and conduct production according to the scheme, so that steel material flow is evenly and punctually distributed in the equipment and the time dimensions in the procedures of the plant-wide process.

What is claimed is:

1. A method of batching and scheduling for steelmaking production with plant-wide process consideration, comprising the following steps of:

step 1, describing a production environment by constructing a directed topological network, wherein each node on the directed topological network represents a specific production unit or inventory equipment, including: a converter, a refining furnace, a continuous caster, a slab warehouse, a hot rolling mill, a temper mill, a hot-rolled coil warehouse, an acid pickling unit and an acid rolling mill; each arc on the directed topological network represents a specific material transfer course from one unit or inventory equipment to another unit or inventory equipment, including: molten steel, slabs, hot-rolled coils and cold-rolled coils;

step 2, according to quality requirements for finished products by different customers' orders, setting product process parameters, comprising: determining the mapping of a product manufacturing process in the directed topological network, calculating casting width ranges of different products in the continuous caster according to steel grades, determining the upgrade relationship between different steel grades, and determining the casting with steel grade change and cost of different types of steel in tundishes;

| | First steelmaking plant | | | | | | | | Second steelmaking plant | | | | | |
|---|---|---|---|---|---|---|---|---|---|---|---|---|---|---|
| | Continuous caster 1# | | | Continuous caster 2# | | | Continuous caster 3# | | | Continuous caster 4# | | |
| Day | Steel grade | Width | Weight | Steel grade | Width | Weight | Steel grade | Width | Weight | Steel grade | Width | Weight |
| 1 | AP0640XX | 1250 | 450 | DP451XX | 850/900 | 1350 | DQ1060XX | 1000 | 1750 | AP0640XX | 1300/1630 | 1500 |
| | AP1360XX | 1250 | 2250 | DQ4151K2 | 850/900 | 1500 | DQ2060XX | 950 | 1000 | | | |
| 2 | AQ0511XX | 1250 | 1500 | IW9123XX | 1300 | 4800 | AP1055XX | 1050/1500 | 950 | AP0640XX | 1300/1630 | 5750 |
| | AQ1640XX | 850/1000 | 1200 | | | | GV5850XX | 1200/1360 | 2000 | | | |
| | | | | | | | DP0161XX | 1000/1180 | 1250 | | | |
| 3 | AP1480XX | 850/960 | 2550 | IV5810XX | 900/1050 | 3450 | DT0140XX | 1050/1600 | 4500 | AP0640XX | 1300/1630 | 3000 |
| | | | | DP1451XX | 850/900 | 1150 | | | | AQ0511K1 | 1100/1250 | 1250 |
| 4 | AP0640K2 | 1050 | 2400 | IV4810B1 | 1350 | 1500 | IV5520XX | 1550 | 2500 | AQ0511XX | 1300/1600 | 2500 |
| | | | | DP1451K1 | 950 | 1800 | DT0140XX | 1250/1550 | 3000 | AP0640XX | 1050/1250 | 3500 |
| | | | | | | | | | | GR4160XX | 1500 | 1000 |
| 5 | AQ0511XX | 1200 | 1500 | IW9124XX | 1300 | 3000 | DT4360XX | 1200/1300 | 2500 | AP0640XX | 1300/1600 | 3500 |
| | AP1460XX | 1050 | 1000 | DP1451XX | 950/1000 | 1800 | DT0140XX | 950/1200 | 1250 | AQ0511XX | 1050/1250 | 2500 |
| | | | | | | | DN0160XX | 950/1050 | 1750 | | | |
| 6 | AP1480XX | 850/960 | 1800 | IW9124XX | 1300 | 3000 | GV5950XX | 1150/1250 | 1500 | AP0640XX | 1300/1600 | 4000 |
| | | | | AQ0940XX | 1050 | 300 | DQ1060XX | 1000 | 2000 | AP1360XX | 1250/1350 | 2000 |
| | | | | DP1451XX | 850/950 | 1500 | DQ1060XX | 950 | 1000 | | | |
| 7 | AP1360XX | 1250 | 500 | DQ4151XX | 850/1050 | 2400 | DRXXXX | 1300/1550 | 4000 | AP1360XX | 1250/1300 | 5500 |
| | DN0140XX | 1200 | 1000 | AQ0940XX | 850 | 900 | DN0150XX | 1300 | 2000 | | | |

In this embodiment of the present invention, the batching plan and the production scheduling scheme are integrated to step 3, determining groups to which product orders belong according to the steel grades, categories, optional manufacturing process and width ranges of the products required by the customers' orders, wherein if the sum of unfullfilled quantities for all orders required by customers is greater than or equal to the maximum number of allowed process continuous casting heats of the tundishes, such customers' orders belong to a subset of large orders, and performing step 6; or else the sum of unfullfilled quantities for all orders required by the customers is smaller than the maximum number of allowed process continuous casting heats of the tundishes, such customers' orders belong to a subset of small orders, and performing step 4 to step 5;

step 4, describing the batching production decision of multiple products in the steelmaking procedure by constructing a mathematical model, comprising the following steps of:

step 4-1, mapping a multi-product batching scheme in a steelmaking production course into decision variables for the mathematical model;

step 4-2, mapping process limits for the steelmaking production course into constraint conditions for the mathematical model, comprising the following steps of:

step 4-2-1, establishing process constraints for substitution relationship of the product steel grades;

step 4-2-2, establishing process constraints for the casting width ranges of the products on continuous casting equipment;

step 4-2-3, establishing process constraints for smelting capacity limit of each batch of the converter, which requires a total weight of the slabs required by the customers' orders and open-ordered slabs limited within the same batch of smelting is larger or less than a standard smelting capacity of the converter by a weight of one slab or less, the open-ordered slabs are surplus materials produced to satisfy the full capacity of converter during smelting course but not assigned to any customers' orders;

step 4-2-4, establishing process constraints for balancing on two strands so as to synchronize the consumptions of molten steel of two strands during casting of each furnace of molten steel on the continuous caster, requiring that casting times of two strands of the same furnace of molten steel on the continuous caster need to be equal to each other, which is mapped on the model as equal number of slabs cast from the two strands;

step 4-2-5, establishing process constraints for cutting length ranges of the slabs on the continuous casting equipment, under limits by the cutting process of the continuous caster and length ordered by the customers, requiring that the lengths of any slabs cast from one furnace of molten steel need to be within a specified range; and step 4-2-6, constructing flexible management constraints for customers' order quantities, requiring that the part below or beyond the customers' order quantities needs to be less than the weight of one slab;

step 4-3, mapping optimized process indicators during a steelmaking production course into an objective function of the mathematical model, to minimize the total weight of the open-ordered slabs output from all batches, minimize the upgrade quantity between different steel grades, minimize the total deviation quantity between the weight of slabs produced in all batches and the standard smelting capacity of the converter, and minimize the total deviation number of quantities ordered by all customers' orders;

step 5, constructing a mutual mapping relationship between a real matrix and the batching scheme, and using an established real matrix as a controlled object to obtain a final optimization batching scheme based on a multi-object parallel iterative improvement strategy, and then to obtain a pre-batching scheme of the subset of small orders in the continuous casting procedure, comprising the following steps of:

step 5-1, constructing a mutual mapping relationship between the real matrix and the batching scheme, comprising the following steps of:

step 5-1-1, constructing a real matrix, wherein the dimension of the real matrix is a product of a total product number, the steel grade and the width of all products, and an element in the matrix is a ratio of the weight of the slabs assigned to a certain steel grade and a certain width by a certain order to the order unfulfilled quantity;

step 5-1-2, obtaining the weight of the slabs with an objective steel grade and an objective width, in all batches, set in a certain order, and the weight of the slabs with the objective steel grade and the objective width, in all batches, sequencing (from large to small) all combinations of the steel grades and widths according to the weight values of all ordered slabs in all batches, and performing steps 5-1-3 to 5-1-9 in the sequence;

step 5-1-3, determining weight vectors of slabs with any combinations of steel grades and widths set by all the orders, constructing an empty batch, and setting the weight of slabs contained in the empty batch to be 0;

step 5-1-4, selecting one order with a first slab of which the weight is greater than 0 from the slab weight vectors, and comparing the remaining capacity of the empty batch with the size of the first slab weight; if the remaining capacity is greater than or equal to the weight of the first slab, performing step 5-1-5, or else performing step 5-1-6;

step 5-1-5, replacing the unfulfilled quantity of a corresponding product in the flexible management constraint conditions for the customers' order quantities with the slab weight of the product, obtaining an integer number of slabs according to the process conditions set forth in steps 4-2-5 to 4-2-6, putting the slabs in the empty batch, updating the slab weight of the batch and setting the slab weight of the product in the slab weight vectors to be 0; then, performing step 5-1-7;

step 5-1-6, replacing the unfulfilled quantity of a corresponding product in the flexible management constraint conditions for the customers' order quantities with the remaining capacity, obtaining an integer number of slabs according to the process conditions set forth in steps 4-2-5 to 4-2-6, putting the slabs in the empty batch, updating the slab weight of the batch and setting the slab weight of the product in the slab weight vectors to be 0;

step 5-1-7, in the absence of the addition of open-ordered slabs, judging whether the slabs contained in the empty batch meet the process constraint conditions limited by the smelting capacity of the converter for each batch; if yes, performing step 5-1-8, or else, performing step 5-1-9;

step 5-1-8, judging whether the slabs contained in the empty batch meet constraint conditions of the balancing on two strands so as to synchronize the consumptions of molten steel of two strands; if yes, directly creating the next empty batch not containing any order and setting the weight of the slabs contained in this batch to be 0, or else remedying the batch by adding or removing one slab to/from the empty batch so as to meet the constraints for balancing on two strands, then creating the next empty batch not containing any order and setting the weight of the slabs contained in this batch to be 0; then, performing step 5-1-10;

step 5-1-9, judging whether the slab weight vector is equal to 0, if yes, adding open-ordered slabs in the last non-empty batch according to the process constraint conditions limited by the smelting capacity of the converter for each batch and process constraint conditions for balancing on two strands so as to synchronize the consumptions of molten steel of two strands, then proceeding to step 5-1-10, or else, returning to perform step 5-1-4; and step 5-1-10, if performing steps 5-1-3 to 5-1-9 for the weight of all ordered slabs in all batches and obtaining a batching scheme of orders for all combinations of steel grades and widths have been finished, then proceeding to step 5-2, or else continuing to perform steps 5-1-3 to 5-1-9;

step 5-2, using the established real matrix as a controlled object to obtain a final optimization batching scheme based on a multi-object parallel iterative improvement strategy, comprising:

step 5-2-1, randomly generating NP real matrices with the same structure as the real matrix described in step 5-1-1, putting all the constructed real matrices in a set, setting elements meeting objective steel grade and objective width in each matrix to be 1, and setting elements not meeting objective steel grade and objective width in each matrix to be 0, wherein NP is pre-set population size based on a multi-object parallel iterative improvement strategy algorithm;

step 5-2-2, returning all the generated real matrices to perform steps 5-1-1 to 5-1-10, establishing a corresponding relationship between each real matrix and the batching scheme, obtaining values of decision variables according to the batching scheme, and substituting the values into the objective function so as to obtain an objective function corresponding to each real matrix;

step 5-2-3, sequencing the obtained objective functions from small to large, dividing the real matrices in the first half of the ranking into one group, and dividing those in the second half of the ranking into the other group;

step 5-2-4, performing mutation operation and cross operation on each real matrix according to the grouping to which the objective function corresponding to each real matrix belongs, to obtain the real matrices after cross operation, then returning all the real matrices after cross operation to perform steps 5-1-1 to 5-1-10, establishing a corresponding relationship between each real matrix after operation and the batching scheme, obtaining values of decision variables according to the batching scheme, and substituting the variables into the objective function to obtain an objective function corresponding to each real matrix after operation;

step 5-2-5, determining the size of the objective function corresponding to the real matrices before and after operation, selecting the real matrices with smaller objective functions as updated real matrices to obtain an updated matrix set, and returning to perform steps 5-2-2 to 5-2-4 until the matrix set is no longer updated, so as to obtain a final matrix set; and step 5-2-6, selecting the real matrix with the smallest objective function value from the final matrix set, and returning such matrix to perform steps 5-1-1 to 5-1-10 so as to obtain the final optimization batching scheme;

step 5-3, merging the obtained steelmaking batches according to the steel grade and the width, merging the steelmaking batches with the same steel grade and width into a campaign, to complete specifying the pre-batching scheme of the subset of small orders in the continuous casting procedure; then performing step 7;

step 6, developing a batching scheme in the steelmaking procedure and a pre-batching scheme in the continuous casting procedure of the subset of large orders;

step 7, determining a scheduling decision of a campaign on the continuous casting equipment by constructing a quantitative mathematical model, comprising: selecting decision variables for the campaign scheduling; quantitatively describing objectives pursued by the campaign scheduling; and quantitatively describing process constraints and management requirements to be followed by the campaign scheduling, wherein the step 7 comprises the following steps of:

step 7-1, selecting the decision variables for the campaign scheduling;

step 7-2, quantitatively describing objectives pursued by the campaign scheduling, comprising: maximizing the utilization of tundishes, minimizing the number of continuously cast slabs in different steel grades, minimizing the number of slabs with adjusted width, minimizing inventory deviations of warm rolls, minimizing inventory deviations of hard rolls, minimizing deviations in demand for hot rolling and cold rolling in all flow directions, and minimizing delay time of the customers' orders; and step 7-3, quantitatively describing process constraints and management requirements to be followed by establishing of the campaign scheduling, comprising: assignment relation constraints and feasible assignment rule constraints of the campaigns on the continuous casting equipment;

step 8, taking the mathematical model established in step 7 as a basis for quantitative calculation, and obtaining a scheduling scheme of the campaign on the continuous casting equipment based on the multi-object parallel iterative improvement strategy by establishing a mutual mapping relationship between the real vectors and the scheduling scheme of the campaign on the continuous casting equipment, and using the established real vectors as the controlled object, obtaining the assignment and sequence of the campaign for the continuous casting equipment; and step 9, adjusting, issuing and executing an integration scheme of batching plan and scheduling.

2. The method of batching and scheduling for steelmaking production with plant-wide process consideration according to claim 1, wherein in step 4-1, mapping a multi-product batching scheme in the steelmaking production course into decision variables for the mathematical model comprising the following steps of:

setting a continuous decision variable $x_{igwk}$ to represent the weight of production slabs in the $k^{th}$ batch of order i with steel grade g and width w; setting an integer decision variable $z_{igwk}$ to represent the number of the production slabs in the $k^{th}$ batch of order i with steel grade g and width w; setting an integer decision variable $z_{0gwk}$ to represent the number of open-ordered slabs in the $k^{th}$ batch with steel grade g and width w; setting 0-1 decision variable $y_{gwk}$ which takes the value of 1 if the $k^{th}$ batch with steel grade g and width w is decided to be produced, or else, $y_{gwk}$ takes the value of 0;

in step 4-2-1, establishing process constraints for substitution relationship of the product steel grades, for any steel grade g, determining a product set $N_g$ produced with the steel grade;

$$N_g = \{i \in N | s_{g_i g} \neq 0\}, \forall g \in G \tag{1}$$

wherein N represents the total product set for a given subset of small orders, $g_i$ represents the steel grade of product i, $G = \cup_{i \in N} g_i$ represents the total steel grade set contained in the product set N, and $s_{g_i g}$ represents the substitute relationship between the steel grade $g_i$ of product i and any steel grade g;

in step 4-2-2, establishing process constraints for the casting width ranges of the products on the continuous casting equipment, for any width w set for a crystallizer of the continuous caster, determining the slabs to be cast into the product set $P_w$ with such width;

$$P_w = \{i \in N | d_i^{min} \leq w \leq d_i^{max}\}, \forall w \in W \tag{2}$$

wherein $W = \cup_{i \in N} d_i^{max}$ represents the total width set required for the crystallizer of the continuous caster during casting of the product set N; $d_i^{max}$ and $d_i^{min}$ respectively represent the maximum and minimum casting width allowed by product i;

in step 4-2-3, establishing process constraints for smelting capacity limit of each batch of the converter, which requires the total weight of the slabs required by the customers' orders and open-ordered slabs limited within the same batch of smelting is larger or less than the standard smelting capacity of the converter by the weight of one slab or less, with the specific formulas as follows:

$$\sum_{i \in N_g \cap P_w} x_{igwk} + z_{0gwk} l^{std} w h^{std} \rho + \delta^+_{gwk} - \delta^-_{gwk} = C y_{gwk}, \tag{3}$$

$$\forall g \in G, w \in W, k \in \{1, 2, \ldots, K_{gw}\}$$

$$z_{igwk} \delta^+_{gwk} \leq x_{igwk}, \tag{4}$$

$$\forall g \in G, w \in W, k \in \{1, 2, \ldots, K_{gw}\}, i \in N_g \cap P_w$$

$$z_{igwk} \delta^-_{gwk} \leq x_{igwk}, \tag{5}$$

$$\forall g \in G, w \in W, k \in \{1, 2, \ldots, K_{gw}\}, i \in N_g \cap P_w$$

wherein C represents the standard smelting capacity of the converter, $Q_i$ represents the unfulfilled quantity of product i, $$K_{gw} = \left\lceil \sum_{i \in N_g \cap P_w} Q_i / C \right\rceil$$

represents the upper limit of the batch number with steel grade g and width w, $\delta^+_{gwk}$ represents a part below the standard smelting capacity of the converter, of the batch, $\delta^-_{gwk}$, represents a part over the standard smelting capacity of the converter, of the batch, $l^{std}$ represents the standard length of the open-ordered slabs in the continuous casting production, $h^{std}$ represents the standard thickness of the open-ordered slabs in the continuous casting production, and $\rho$ represents the density of the molten steel;

step 4-2-4, establishing process constraints for balancing on two strands so as to synchronize the consumptions of molten steel of two strands during casting of each furnace of molten steel on the continuous caster, requiring that casting times of two strands of the same furnace of molten steel on the continuous caster need to be equal to each other, which is mapped on the model as equal number of slabs cast from the two strands, with the specific formula as follows:

$$\sum_{i \in N_g \cap P_w} z_{igwk} + z_{0gwk} = 2 n_{gwk}, \tag{6}$$

$$\forall g \in G, w \in W, k = \{1, 2, \ldots, K_{gw}\}$$

wherein $n_{gwk}$ represents an auxiliary integer variable, indicating the number of slabs produced by the odd strand of the $k^{th}$ batch having steel grade g and width w;

in step 4-2-5, establishing process constraints for cutting length ranges of slabs on the continuous casting equipment, under limits by the cutting process of the continuous caster and length ordered by the customers, requiring that the lengths of any slabs cast from one furnace of molten steel need to be within a specified range, with the specific formula as follows:

$$l_i^{min} \leq x_{igwk}/z_{igwk} w h_i \rho \leq l_i^{max}, \forall g \in G, w \in W, k = \{1, 2, \ldots, K_{gw}\}, i \in N_g \cap P_w, \tag{7}$$

wherein $h_i$ represents the slab thickness required for product i, while $l_i^{max}$ and $l_i^{min}$ represent the maximum and minimum slab length required by product i;

in step 4-2-6, constructing flexible management constraints for the customers' order quantities, requiring that the part below or beyond a quantity ordered by the customers needs to be less than the weight of one slab;

$$\sum_{g,l,k} x_{iglk} + \theta_i^+ - \theta_i^- = Q_i \quad \forall i \in N \tag{8}$$

$$z_{igwk} \theta_i^+ \leq x_{igwk}, \tag{9}$$

$$\forall g \in G, w \in W, k \in \{1, 2, \ldots, K_{gw}\}, i \in N_g \cap P_w$$

$$z_{igwk} \theta_i^- \leq x_{igwk}, \tag{10}$$

$$\forall g \in G, w \in W, k \in \{1, 2, \ldots, K_{gw}\}, i \in N_g \cap P_w$$

wherein $\theta_i^+$ represents the insufficient part of the unfulfilled quantity, and $\theta_i^-$ represents the excessive part of the unfulfilled quantity;

the objective function described in step 4-3 is shown as follows:

$$F_0 = \lambda_1 \sum_{g \in G} \sum_{w \in W} \sum_{k=1,\ldots,K_{gw}} l^{std} w h^{std} \rho z_{0gwk} + \tag{11}$$

$$\lambda_2 \sum_{i \in N} \sum_{g \in G} \sum_{w \in W} \sum_{k=1,\ldots,K_{gw}} s_{g_i g} x_{igwk} +$$

$$\lambda_3 \sum_{g \in G} \sum_{w \in W} \sum_{k=1,\ldots,K_{gw}} (\delta^+_{gwk} + \delta^-_{gwk}) + \lambda_4 \sum_{i \in N} (\theta_i^+ + \theta_i^-)$$

wherein $F_0$ represents the total cost for production batching of the subset of small orders, which is the linear aggregation of: the total quantity of open-ordered slabs of all batches, the upgrade quantity between different steel grades, deviation ordered quantity of all the customers' orders, and deviation quantity of the standard smelting capacity of the converter, $\lambda_1, \lambda_2, \lambda_3, \lambda_4 \in [0, 1]$ representing the weight coefficients of different objectives, and $\lambda_1+\lambda_2+\lambda_3+\lambda_4=1$.

3. The method of batching and scheduling for steelmaking production with plant-wide process consideration according to claim 1, wherein the real matrix described in step 5-1-1 is given by the following specific formula:

$$A = \begin{pmatrix} a_{111} & a_{112} & \cdots & a_{11,|W|} & a_{121} & a_{122} & \cdots & a_{12,|W|} & \cdots & a_{1,|G|,1} & a_{1,|G|,2} & \cdots & a_{1,|G|,|W|} \\ a_{211} & a_{212} & \cdots & a_{21,|W|} & a_{221} & a_{222} & \cdots & a_{22,|W|} & \cdots & a_{2,|G|,1} & a_{2,|G|,2} & \cdots & a_{2,|G|,|W|} \\ \vdots & \vdots & \vdots & \vdots & \vdots & \vdots & & \vdots & \vdots & \vdots & \vdots & & \vdots \\ a_{|N|,11} & a_{|N|,12} & \cdots & a_{|N|,1,|W|} & a_{|N|,11} & a_{|N|,22} & \cdots & a_{|N|,2,|W|} & \cdots & a_{|N|,|G|,1} & a_{|N|,|G|,2} & \cdots & a_{|N|,|G|,|W|} \end{pmatrix}$$

wherein A represents a $|N| \times (|G| \times |W|)$-dimension real matrix, N represents a total product set of a given subset of small orders, W represents a set of all possible widths required to be set for the crystallizer of the continuous caster during casting of product set N, and $a_{|N|,|G|,|W|}$ represents the ratio of the weight of the slabs in all batches corresponding to the order N with steel grade G and width W to the unfulfilled quantity of the order N.

4. The method of batching and scheduling for steelmaking production with plant-wide process consideration according to claim 1, wherein in step 5-1-2, obtaining the weight of the slabs with the objective steel grade and the objective width, in all batches, set in a certain order, and the weight of the slabs with the objective steel grade and the objective width, in all batches, with the specific calculation formulas as follows:

$$b_{igw} = \frac{a_{igw}Q_i}{\sum_{g \in G}\sum_{w \in W} a_{igw}} \quad (13)$$

$$B_{gw} = \sum_{i \in N} b_{igw} \quad (14)$$

wherein $b_{igw}$ represents the weight of the slabs with the steel grade g and width w, in all batches, set in order i, $B_{gw}$ represents the weight of all the ordered slabs with steel grade g and width w, in all batches, $a_{igw}$ represents the ratio of the weight of the slabs with steel grade g and width w, in all batches, set in the order i to unfulfilled production amount of order i, and $Q_i$ represents the unfulfilled quantity of product i.

5. The method of batching and scheduling for steelmaking production with plant-wide process consideration according to claim 1, wherein in step 5-1-5, replacing the unfulfilled quantity of a corresponding product in the flexible management constraint conditions for the customers' order quantities with the slab weight of the product, replacing the unfulfilled quantity of product i in formula $$\sum_{g,l,k} x_{iglk} + \theta_i^+ - \theta_i^- = Q_i \quad \forall i \in N$$

with slab weight $b_{igw}$ of the product; and in step 5-1-6, replacing the unfulfilled quantity of a corresponding product in the flexible management constraint conditions for the customers' order quantities with the remaining capacity, replacing the unfulfilled quantity of product i in formula $$\sum_{g,l,k} x_{iglk} + \theta_i^+ - \theta_i^- = Q_i \quad \forall i \in N$$

with the remaining capacity $C-E_k$, wherein C represents the standard smelting capacity of the converter, and $E_k$ represents the weight of the slabs contained in the batch.

6. The method of batching and scheduling for steelmaking production with plant-wide process consideration according to claim 1, wherein in step 5-2-4, performing mutation operation and cross operation on each real matrix according to the grouping to which the objective function corresponding to each real matrix belongs comprises the following steps of:

step 5-2-4-1, selecting three real matrices $A^{r1}$, $A^{r2}$, and $A^{r3}$ which are different from the objective real matrix $A^j$ and are different from each other from the set $\{A^1, A^2, \ldots, A^{NP}\}$ composed of the real matrices, $j \neq r1 \neq r2 \neq r3$;

step 5-2-4-2, randomly generating a mutation step length factor F' from an evenly distributed real interval [j/NP, 1];

step 5-2-4-3, performing differential operation on the real matrices $A^j, A^{r1}, A^{r2}$, and $A^{r3}$, to obtain a real matrix $V^j$ after the mutation operation;

$$V^j = A^j + \begin{cases} F_0(A^{r1} - A^j) + F_0(A^{r2} - A^{r3}), & A^j \in S' \\ F_0(A^{r*} - A^j) + F_0(A^{r2} - A^{r3}), & A^j \in I \end{cases} \quad (15)$$

wherein $A^{r*}$ is the real matrix currently with the smallest current objective function value, and $f(A^{r*})=\min\{f(A^j)|j=1, 2, \ldots, NP\}$ is met; S' represents the group of the real matrices in the first half of the ranking when sequencing the obtained objective functions from small to large, and I represents the group of those in the second half of the ranking;

step 5-2-4-4, randomly generating a cross probability factor $CR^{igw}$ for each element of the matrix from the evenly distributed real interval [j/NP, 1];

step 5-2-4-5, performing cross operation on each pair of real matrices $A^j$ and $V^j$ to generate a real matrix $U^j$;

$$u_{igw}^j = \begin{cases} v_{igw}^j, & \text{if } (rand_{igw}^j(0,1) < CR_{igw}) \\ a_{igw}^j, & \text{else} \end{cases} \quad (16)$$

wherein $u_{igw}^j$ represents an element in the real matrix $U^j$, $v_{igw}^j$ represents an element in the real matrix $V^j$, $a_{igw}^j$ represents an element in the real matrix $A^j$, $j=1, 2, \ldots, NP$, $i \in N$, $w \in W$, $k \in \{1, 2, \ldots, K_{gw}\}$; $w$ represents a set of all possible widths required for the crystallizer of the continuous caster during casting of product set N; $K_{gw}$ represents the upper limit of the number of batches with steel grade g and width w; and $rand_{igw}^j(0,1)$ represents random numbers obeying normal distribution between (0, 1);

step 5-2-4-6, judging whether element is $u_{igw}^j < L$ or $u_{igw}^j > U$, if yes, treating boundary conditions for the real matrix $U^j$, or else, completing the cross operation, with the specific formula as follows:

$$u_{igw}^j = L + rand_{igw}^j(0,1)(U-L) \quad (17)$$

wherein L represents the lower limit of the value range of element $u_{igw}^j$, and U represents the upper limit of the value range of element $u_{igw}^j$.

7. The method of batching and scheduling for steelmaking production with plant-wide process consideration according to claim 1, wherein in step 7-1, selecting the decision variables for the campaign scheduling comprises the following steps of:

setting 0-1 decision variable $u_{rls}$ to represent whether campaign r is assigned at the first position of the continuous casting equipment s; setting auxiliary variable $Q_{ls}$ to represent the casting completion time of a campaign at the first position of the continuous casting equipment s; setting auxiliary variable $T_r$ to represent the casting completion time of the campaign r; setting auxiliary variable $t_i$ to represent the casting completion time of order i; setting auxiliary variable $I_{hd}^{warm}$ to represent a planned inventory for warm rolls in a front warehouse of a hot rolling plant h on the $d^{th}$ day; setting auxiliary variable $I_{hd}^{hard}$ to represent a planned inventory for the hard rolls in front warehouse of a hot rolling plant h on the $d^{th}$ day; and setting auxiliary variable $\Delta_{fd}$ to represent the quantity of slabs planned to be produced by a steelmaking plant on the $d^{th}$ day for flow direction $f$;

in step 7-2, maximizing the utilization of tundishes, requiring that the number of tundishes used after the casting of all campaigns needs to be the minimum, with the specific formula as follows:

$$F_1 = \sum_{s \in S} \left( \left\lceil \frac{\sum_{l=1}^{l_1-1} \sum_{r \in R} a_r u_{rls}}{Tun^{max}} \right\rceil + \sum_{\tau \in \{1,2,\ldots,b_s-1\}} \left( \left\lceil \frac{\sum_{l=l_\tau}^{l_{\tau+1}-1} \sum_{r \in R} a_r u_{rls}}{Tun^{max}} \right\rceil \right) + \left\lceil \frac{\sum_{l=l_{b_s}}^{|R|} \sum_{r \in R} a_r u_{rls}}{Tun^{max}} \right\rceil \right) \quad (18)$$

wherein $F_1$ represents the total cost of the tundishes updated for all campaign scheduling; S represents a set of continuous casting equipment; R represents a set of all campaigns; $a_r$ represents the number of heats contained in campaign r; $Tun^{max}$ represents the maximum number of heats which can be cast in one tundish; $b_s$ represents the number of batches which cannot be cast continuously on the continuous casting equipment s; $l_\tau$, $\forall \tau \in \{1, 2, \ldots, b_s\}$ represents the position of the $\tau^{th}$ batch which cannot be cast with steel grade change;

in step 7-2, minimizing the number of continuously cast slabs with different steel grades, with the specific formula:

$$F_2 = \sum_{s \in S} \left( \sum_{l=1}^{l_1-2} f\left(g_{\sum_{r \in R} ru_{rls}}, g_{\sum_{r \in R} ru_{r,l+1,s}}\right) + \sum_{\tau \in \{1,2,\ldots,b_s-1\}} \sum_{l=l_\tau}^{l_{\tau+1}-2} f(g_{\sum_{r \in R} ru_{rls}}, g_{\sum_{r \in R} ru_{rl+1s}}) + \sum_{l=l_{b_s}}^{|R|-1} f(g_{\sum_{r \in R} ru_{rls}}, g_{\sum_{r \in R} ru_{rl+1s}}) \right) \quad (19)$$

wherein $F_2$ represents the total cost for continuous casting of all different steel grades in campaign scheduling;

$$\sum_{r \in R} ru_{rls}$$

represents the campaign assigned at the first position on the continuous casting equipment s, and $$g_{\sum_{r \in R} ru_{rls}}$$

represents the steel grade of campaign $$\sum_{r \in R} ru_{rls};$$

in step 7-2, minimizing the number of slabs with adjusted width, with the specific formula:

$$F_3 = \sum_{s \in S} \left( \sum_{l=1}^{l_1-2} h\left(w_{\sum_{r \in R} ru_{rls}}, w_{\sum_{r \in R} ru_{r,l+1,s}}\right) + \sum_{\tau \in \{1,2,\ldots,b_s-1\}} \sum_{l=l_\tau}^{l_{\tau+1}-2} h(w_{\sum_{r \in R} ru_{rls}}, w_{\sum_{r \in R} ru_{rl+1s}}) + \sum_{l=l_{b_s}}^{|R|-1} h(w_{\sum_{r \in R} ru_{rls}}, w_{\sum_{r \in R} ru_{rl+1s}}) \right) \quad (20)$$

wherein $F_3$ represents the total cost for all width adjustment for campaign scheduling;

$$w_{\sum_{r \in R} ru_{rls}}$$

represents the width of campaign $$\sum_{r \in R} ru_{rls};$$

if the two parameters are the same, the function h(.) is 0, else, the function h(.) is 1;

in step 7-2, minimizing inventory deviations of warm rolls, requiring that the deviation between planned inventory for the warm rolls in a hot-rolling front warehouse and the objective inventory needs to be the minimum to ensure the smooth production of hot rolling, with the specific formula as follows:

$$F_4 = \sum_{h \in H} \sum_{d \in D} |I_{hd}^{warm} - \bar{I}_{hd}^{warm}| \qquad (21)$$

wherein $F_4$ represents the risk cost of all warm rolls inventories; H represents a set of hot rolling mills, D represents a set of days in a planned period, and $\bar{I}_{hd}^{warm}$ represents the objective inventory of the warm rolls required for the hot rolling plant h on the $d^{th}$ day;

in step 7-2, minimizing inventory deviations of hard rolls, requiring that the deviations between the planned inventory for the hard rolls in the hot-rolling front warehouse and the allowed maximum and minimum inventories of the hard rolls need to be the minimum, so as to reduce material flow blockage due to excessive hard rolls, with the specific formula as follows:

$$F_5 = \sum_{h \in H} \sum_{d \in D} \max(I_{hd}^{hard} - \bar{I}_{hd}^{hard}, 0) + \max(\underline{I}_{hd}^{hard} - I_{hd}^{hard}, 0) \qquad (22)$$

wherein $F_5$ represents the risk cost of all hard roll inventories; $\bar{I}_{hd}^{hard}$ represents the maximum hard roll inventory in the hot rolling plant h on the $d^{th}$ day; $\underline{I}_{hd}^{hard}$ represents the allowed minimum hard roll inventory in the hot rolling plant h on the $d^{th}$ day;

in step 7-2, minimizing delay time of the customers' orders, with the specific formula as follows:

$$F_6 = \sum_{i \in N^R} \max(t_i - Due_i, 0) + \max(Ear_i - t_i, 0) \qquad (23)$$

wherein $F_6$ represents satisfaction degree gains the customers' orders; $N^R$ represents a set of orders with delivery requirements, $Ear_i$ represents the earliest delivery date of order i, and $Due_i$ represents the latest delivery date of order i;

in step 7-3, quantitatively describing process constraints and management requirements to be followed by the campaign scheduling comprises the following steps of:

creating assignment relation constraints of campaigns on the continuous casting equipment, requiring that each campaign can only be assigned to one position on the continuous casting equipment, and each position on each piece of continuous casting equipment can only be assigned with one campaign, non-assigned positions on each continuous casting equipment are behind positions assigned with the campaigns, with the specific formulas as follows:

$$\sum_{s \in S} \sum_{l=1}^{|R|} u_{rls} = 1, \forall r \in R \qquad (24)$$

$$\sum_{r \in R} u_{rls} \le 1, s \in S, l \in \{1, 2, \dots, |R|\} \qquad (25)$$

$$\sum_{r \in R} u_{r,l+1,s} \le \sum_{r \in R} u_{rls}, s \in S, l \in \{1, 2, \dots, |R| - 1\} \qquad (26)$$

creating feasible assignment rule constraints, allowing a campaign to be assigned onto the continuous casting equipment only when order manufacturing procedures contained in the campaign are compatible with the given continuous casting equipment, with the specific formula as follows;

$$u_{rls} \le v_{rs} \qquad (27)$$

in the formula, $v_{rs}$ represents a compatibility parameter between the order manufacturing procedures contained in the campaign r and continuous casting equipment s, $v_{rs} \in \{0,1\}$.

8. The method of batching and scheduling for steelmaking production with plant-wide process consideration according to claim 1, wherein in step 8, establishing a mutual mapping relationship between the real vectors and the scheduling scheme of the campaigns on the continuous casting equipment comprises the steps of:

step 8-1, setting a 2 |R|-dimension real vector PP=[$a_1$, $a_2 \dots a_{|R|}|b_1, b_2 \dots b_{|R|}$], and determining the value of each component of the real vector PP, wherein $a_r$ and $b_r$ are dimensionless real parameters in the range of [0, 1]; $1 \le r \le |R|$, wherein R represents a set of all campaigns;

step 8-2, determining set Rs of campaigns assigned to any continuous casting equipment s according to a $b_r$ value $$R_s = \left\{ v_{rs} = 1, \frac{\sum_{s'=1}^{s} v_{rs'} - 1}{\sum_{s'=1}^{|S|} v_{rs'}} < b_r \le \frac{\sum_{s'=1}^{s} v_{rs'}}{\sum_{s'=1}^{|S|} v_{rs'}} \middle| r \in R \right\};$$

and step 8-3, determining the sequencing of all campaigns assigned to any continuous casting equipment s according to the $a_r$ value;

sequencing batch set Rs by the $a_r$ value from small to large, to determine the sequence of all the campaigns assigned to the continuous casting equipment s.

* * * * *